(12) United States Patent
Akanishi et al.

(10) Patent No.: US 10,982,733 B2
(45) Date of Patent: Apr. 20, 2021

(54) BICYCLE-CHAIN OUTER LINK PLATE AND BICYCLE CHAIN

(71) Applicant: SHIMANO INC., Sakai (JP)

(72) Inventors: Kenichi Akanishi, Sakai (JP); Atsuhiro Emura, Sakai (JP); Yuta Mizutani, Sakai (JP)

(73) Assignee: SHIMANO INC., Sakai (JP)

( * ) Notice: Subject to any disclaimer, the term of this patent is extended or adjusted under 35 U.S.C. 154(b) by 226 days.

(21) Appl. No.: 15/719,573

(22) Filed: Sep. 29, 2017

(65) Prior Publication Data

US 2019/0101189 A1 Apr. 4, 2019

(51) Int. Cl.
*F16G 13/06* (2006.01)
*B62M 9/00* (2006.01)

(52) U.S. Cl.
CPC ............... *F16G 13/06* (2013.01); *B62M 9/00* (2013.01); *B62M 2009/005* (2013.01)

(58) Field of Classification Search
CPC ... F16G 13/06; B62M 9/10; B62M 2009/005; B62M 9/00; B62M 9/06
USPC .................................................. 474/226, 227
See application file for complete search history.

(56) References Cited

U.S. PATENT DOCUMENTS

| | | | |
|---|---|---|---|
| 4,642,078 A * | 2/1987 | Dupoyet | F16G 13/06 474/206 |
| 5,066,265 A * | 11/1991 | Wu | F16G 13/06 474/206 |
| 5,098,349 A * | 3/1992 | Wu | F16G 13/06 474/206 |
| 5,226,857 A * | 7/1993 | Ono | F16G 13/06 474/231 |
| 5,291,730 A * | 3/1994 | Wu | F16G 15/00 474/220 |
| 5,346,006 A * | 9/1994 | Wu | F16G 13/06 474/206 |
| 5,741,196 A * | 4/1998 | Campagnolo | B62M 9/10 474/206 |
| 6,110,064 A * | 8/2000 | Guichard | F16G 13/06 474/230 |
| 7,325,391 B1 | 2/2008 | Oishi et al. | |

(Continued)

FOREIGN PATENT DOCUMENTS

DE 202016004662 U1 10/2016

*Primary Examiner* — Henry Y Liu
(74) *Attorney, Agent, or Firm* — Mori & Ward, LLP

(57) ABSTRACT

A bicycle-chain outer link plate comprises a first outer-link end portion, a second outer-link end portion, and a first outer-link intermediate portion. The first outer-link end portion comprises a first outer surface, a first inner surface, a first outer-link opening, and a first outer-link end outermost edge. The first outer-link intermediate portion comprises a first intermediate outer surface, a first intermediate inner surface, a first outer-link intermediate outermost edge, a first additional outer-link intermediate outermost edge, and a first intermediate chamfer. The first intermediate chamfer has a first minimum distance defined between the first outer-link intermediate outermost edge and the first inner edge along a reference line. A distance defined between the first outer-link intermediate outermost edge and the first additional outer-link intermediate outermost edge on the reference line is minimum in the first outer-link intermediate portion. The first minimum distance is equal to or larger than 1 mm.

20 Claims, 21 Drawing Sheets

(56) References Cited

U.S. PATENT DOCUMENTS

| | | | | |
|---|---|---|---|---|
| 7,837,584 B2* | 11/2010 | Wu | ............. | F16G 13/06 474/218 |
| 7,914,410 B2* | 3/2011 | Oishi | ............. | F16G 13/06 474/220 |
| 7,946,941 B2* | 5/2011 | Oishi | ............. | F16G 13/06 474/206 |
| 8,734,280 B2* | 5/2014 | Oishi | ............. | F16G 13/06 474/230 |
| 9,255,624 B2* | 2/2016 | Fukumori | ............. | F16G 13/06 |
| 9,303,725 B2* | 4/2016 | Fukumori | ............. | B62M 9/00 |
| 9,494,216 B2* | 11/2016 | Fukumori | ............. | F16G 13/06 |
| 9,528,588 B2* | 12/2016 | Reiter | ............. | B62M 9/10 |
| 9,939,045 B2* | 4/2018 | Fukumori | ............. | F16G 13/06 |
| 10,371,234 B2* | 8/2019 | Civiero | ............. | B62M 9/10 |
| 2008/0081720 A1* | 4/2008 | Oishi | ............. | F16G 13/06 474/227 |
| 2008/0182691 A1* | 7/2008 | Wu | ............. | F16G 13/06 474/223 |
| 2011/0081195 A1* | 4/2011 | Wang | ............. | F16G 13/06 403/154 |
| 2015/0094182 A1* | 4/2015 | Fukumori | ............. | F16G 13/06 474/206 |
| 2016/0230840 A1* | 8/2016 | Wu | ............. | F16G 13/07 |

* cited by examiner

BICYCLE-CHAIN OUTER LINK PLATE AND BICYCLE CHAIN

BACKGROUND OF THE INVENTION

Field of the Invention

The present invention relates to a bicycle-chain outer link plate and a bicycle chain.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a chain.

SUMMARY OF THE INVENTION

In accordance with a first aspect of the present invention, a bicycle-chain outer link plate comprises a first outer-link end portion, a second outer-link end portion, and a first outer-link intermediate portion. The first outer-link end portion comprises a first outer surface, a first inner surface, a first outer-link opening, and a first outer-link end outermost edge. The first inner surface is provided on a reverse side of the first outer surface to face toward an additional outer link plate in an assembled state where the outer link plate and the additional outer link plate are assembled. The first outer-link opening has a first outer-link center axis and extends from the first outer surface to the first inner surface along the first outer-link center axis. The first outer-link end outermost edge is provided radially outwardly of the first outer-link opening. The second outer-link end portion comprises a second outer surface, a second inner surface, a second outer-link opening, and a second outer-link end outermost edge. The second inner surface is provided on a reverse side of the second outer surface to face toward the additional outer link plate in the assembled state. The second outer-link opening has a second outer-link center axis and extends from the second outer surface to the second inner surface. The second outer-link end outermost edge is provided radially outwardly of the second outer-link opening. The first outer-link intermediate portion interconnects the first outer-link end portion and the second outer-link end portion. The first outer-link intermediate portion comprises a first intermediate outer surface, a first intermediate inner surface, a first outer-link intermediate outermost edge, a first additional outer-link intermediate outermost edge, and a first intermediate chamfer. The first intermediate inner surface is provided on a reverse side of the first intermediate outer surface to face toward the additional outer link plate in the assembled state. The first outer-link intermediate outermost edge is provided between the first outer-link end outermost edge and the second outer-link end outermost edge. The first additional outer-link intermediate outermost edge is provided between the first outer-link end outermost edge and the second outer-link end outermost edge. The first intermediate chamfer extends along the first outer-link intermediate outermost edge and having a first inner edge. The first intermediate chamfer has a minimum distance defined between the first outer-link intermediate outermost edge and the first inner edge along a reference line. The reference line is perpendicular to a first outer-link longitudinal axis extending from the first outer-link center axis to the second outer-link center axis when viewed in an axial direction parallel to the first outer-link center axis. A distance defined between the first outer-link intermediate outermost edge and the first additional outer-link intermediate outermost edge on the reference line is minimum in the first outer-link intermediate portion. The first minimum distance is equal to or larger than 1 mm.

With the bicycle-chain outer link plate according to the first aspect, it is possible to smoothly bring the bicycle-chain outer link plate into engagement with a tooth of a sprocket.

In accordance with a second aspect of the present invention, a bicycle-chain outer link plate comprises a first outer-link end portion, a second outer-link end portion, and a first outer-link intermediate portion. The first outer-link end portion comprises a first outer surface, a first inner surface, a first outer-link opening, and a first outer-link end outermost edge. The first inner surface is provided on a reverse side of the first outer surface to face toward an additional outer link plate in an assembled state where the outer link plate and the additional outer link plate are assembled. The first outer-link opening has a first outer-link center axis and extends from the first outer surface to the first inner surface along the first outer-link center axis. The first outer-link end outermost edge is provided radially outwardly of the first outer-link opening. The second outer-link end portion comprises a second outer surface, a second inner surface, a second outer-link opening, and a second outer-link end outermost edge. The second inner surface is provided on a reverse side of the second outer surface to face toward the additional outer link plate in the assembled state. The second outer-link opening has a second outer-link center axis extending from the second outer surface to the second inner surface. The second outer-link end outermost edge is provided radially outwardly of the second outer-link opening. The first outer-link intermediate portion interconnects the first outer-link end portion and the second outer-link end portion. The first outer-link intermediate portion comprises a first intermediate outer surface, a first intermediate inner surface, a first additional outer-link intermediate outermost edge, and a first intermediate chamfer. The first intermediate inner surface is provided on a reverse side of the first intermediate outer surface to face toward the additional outer link plate in the assembled state. The first outer-link intermediate outermost edge is provided between the first outer-link end outermost edge and the second outer-link end outermost edge. The first additional outer-link intermediate outermost edge is provided between the first outer-link end outermost edge and the second outer-link end outermost edge. The first intermediate chamfer extends along the first outer-link intermediate outermost edge and has a first inner edge. The first intermediate chamfer has a first minimum distance defined between the first outer-link intermediate outermost edge and the first inner edge along a reference line. The reference line is perpendicular to a first outer-link longitudinal axis extending from the first outer-link center axis to the second outer-link center axis when viewed in an axial direction parallel to the first outer-link center axis. The reference line extends from a center of curvature of a reference circular arc corresponding to the first outer-link intermediate outermost edge when viewed in the axial direction. The first minimum distance is equal to or larger than 1 mm.

With the bicycle-chain outer link plate according to the second aspect, it is possible to smoothly bring the bicycle-chain outer link plate into engagement with a tooth of a sprocket.

In accordance with a third aspect of the present invention, the bicycle-chain outer link plate according to the first or second aspect is configured so that the first minimum distance is equal to or smaller than 2 mm.

With the bicycle-chain outer link plate according to the third aspect, it is possible to more smoothly bring the bicycle-chain outer link plate into engagement with the tooth of the sprocket.

In accordance with a fourth aspect of the present invention, the bicycle-chain outer link plate according to any one of the first to third aspects is configured so that the first outer-link intermediate portion includes a first additional intermediate chamfer extending along the first additional outer-link intermediate outermost edge and having a first additional inner edge. The first additional intermediate chamfer has a first additional minimum distance defined between the first additional outer-link intermediate outermost edge and the first additional inner edge along the reference line. A distance defined between the first outer-link intermediate outermost edge and the first additional outer-link intermediate outermost edge on the reference line is minimum in the first outer-link intermediate portion. The first additional minimum distance is equal to or larger than 1 mm.

With the bicycle-chain outer link plate according to the fourth aspect, it is possible to more smoothly bring the bicycle-chain outer link plate into engagement with the tooth of the sprocket.

In accordance with a fifth aspect of the present invention, the bicycle-chain outer link plate according to the fourth aspect is configured so that the first additional minimum distance is equal to or smaller than 2 mm.

With the bicycle-chain outer link plate according to the fifth aspect, it is possible to more smoothly bring the bicycle-chain outer link plate into engagement with the tooth of the sprocket.

In accordance with a sixth aspect of the present invention, the bicycle-chain outer link plate according to the fourth or fifth aspect is configured so that the first additional minimum distance is different from the first minimum distance.

With the bicycle-chain outer link plate according to the sixth aspect, it is possible to make the bicycle-chain outer link plate have different functions on the first additional intermediate chamfer and the first additional intermediate chamfer.

In accordance with a seventh aspect of the present invention, the bicycle-chain outer link plate according to the fourth or fifth aspect is configured so that the first minimum additional distance is equal to the first minimum distance.

With the bicycle-chain outer link plate according to the seventh aspect, it is possible to more smoothly bring the bicycle-chain outer link plate into engagement with the tooth of the sprocket.

In accordance with an eighth aspect of the present invention, the bicycle-chain outer link plate according to any one of the first to seventh aspects is configured so that the first outer-link intermediate portion has a first distance defined in the axial direction on the first outer-link longitudinal axis. The first outer-link intermediate outermost edge has a second distance defined in the axial direction. The first outer-link end outermost edge has a third distance defined in the axial direction. The first distance is larger than the second distance and the third distance. The second distance is larger than the third distance.

With the bicycle-chain outer link plate according to the eighth aspect, it is possible to make a shifting operation smooth with reducing an effect on strength of the bicycle-chain outer link plate in a case where a width of the bicycle-chain outer link plate is reduced.

In accordance with a ninth aspect of the present invention, the bicycle-chain outer link plate according to the eighth aspect is configured so that the first distance ranges from 0.87 mm to 0.91 mm.

With the bicycle-chain outer link plate according to the ninth aspect, it is possible to make the shifting operation smoother with reducing an effect on strength of the bicycle-chain outer link plate in a case where a width of the bicycle-chain outer link plate is reduced.

In accordance with a tenth aspect of the present invention, the bicycle-chain outer link plate according to the eighth or ninth aspect is configured so that the second distance ranges from 0.79 mm to 0.83 mm.

With the bicycle-chain outer link plate according to the tenth aspect, it is possible to make the shifting operation smoother with reducing an effect on strength of the bicycle-chain outer link plate in a case where a width of the bicycle-chain outer link plate is reduced.

In accordance with an eleventh aspect of the present invention, the bicycle-chain outer link plate according to any one of the eighth to tenth aspects is configured so that the third distance ranges from 0.44 mm to 0.48 mm.

With the bicycle-chain outer link plate according to the eleventh aspect, it is possible to make the shifting operation smoother with reducing an effect on strength of the bicycle-chain outer link plate in a case where a width of the bicycle-chain outer link plate is reduced.

In accordance with a twelfth aspect of the present invention, the bicycle-chain outer link plate according to any one of the first to seventh aspects is configured so that the first outer-link intermediate portion has a first distance defined in the axial direction on the first outer-link longitudinal axis. The first outer-link intermediate outermost edge has a second distance defined in the axial direction. The second distance ranges from 89% to 93% of the first distance.

With the bicycle-chain outer link plate according to the twelfth aspect, it is possible to make the shifting operation smoother with reducing an effect on strength of the bicycle-chain outer link plate in a case where a width of the bicycle-chain outer link plate is reduced.

In accordance with a thirteenth aspect of the present invention, the bicycle-chain outer link plate according to the twelfth aspect is configured so that the first distance ranges from 0.87 mm to 0.91 mm. The second distance ranges from 0.79 mm to 0.83 mm.

With the bicycle-chain outer link plate according to the thirteenth aspect, it is possible to make the shifting operation smoother with reducing an effect on strength of the bicycle-chain outer link plate in a case where a width of the bicycle-chain outer link plate is reduced.

In accordance with a fourteenth aspect of the present invention, the bicycle-chain outer link plate according to any one of the first to thirteenth aspects further comprises an outline having an asymmetric shape relative to the first outer-link longitudinal axis when viewed in the axial direction.

With the bicycle-chain outer link plate according to the fourteenth aspect, the asymmetric shape can make the bicycle-chain outer link plate have different functions on both sides.

In accordance with a fifteenth aspect of the present invention, the bicycle-chain outer link plate according to any one of the first to fourteenth aspects is configured so that the second outer-link opening has an elongated shape extending along the first outer-link longitudinal axis.

With the bicycle-chain outer link plate according to the fifteenth aspect, it is possible to obtain the same effect as that of the bicycle-chain outer link plate according to the first aspect.

In accordance with a sixteenth aspect of the present invention, the bicycle-chain outer link plate according to the fifteenth aspect is configured so that the second outer-link opening has a longitudinal axis. The longitudinal axis of the second outer-link opening is inclined relative to the outer-link longitudinal axis when viewed in the axial direction.

With the bicycle-chain outer link plate according to the sixteenth aspect, it is possible to improve a degree of freedom of designing a shape of the second outer-link opening.

In accordance with a seventeenth aspect of the present invention, a bicycle chain comprises the bicycle-chain outer link plate according to any one of the first to sixteenth aspects and a first link pin provided in the first outer-link opening. The first link pin is engaged with the additional outer link plate.

With the bicycle-chain outer link plate according to the seventeenth aspect, the bicycle-chain outer link plate makes a shifting operation smooth with reducing an effect on strength of the bicycle-chain outer link plate in a case where a width of the bicycle-chain outer link plate is reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
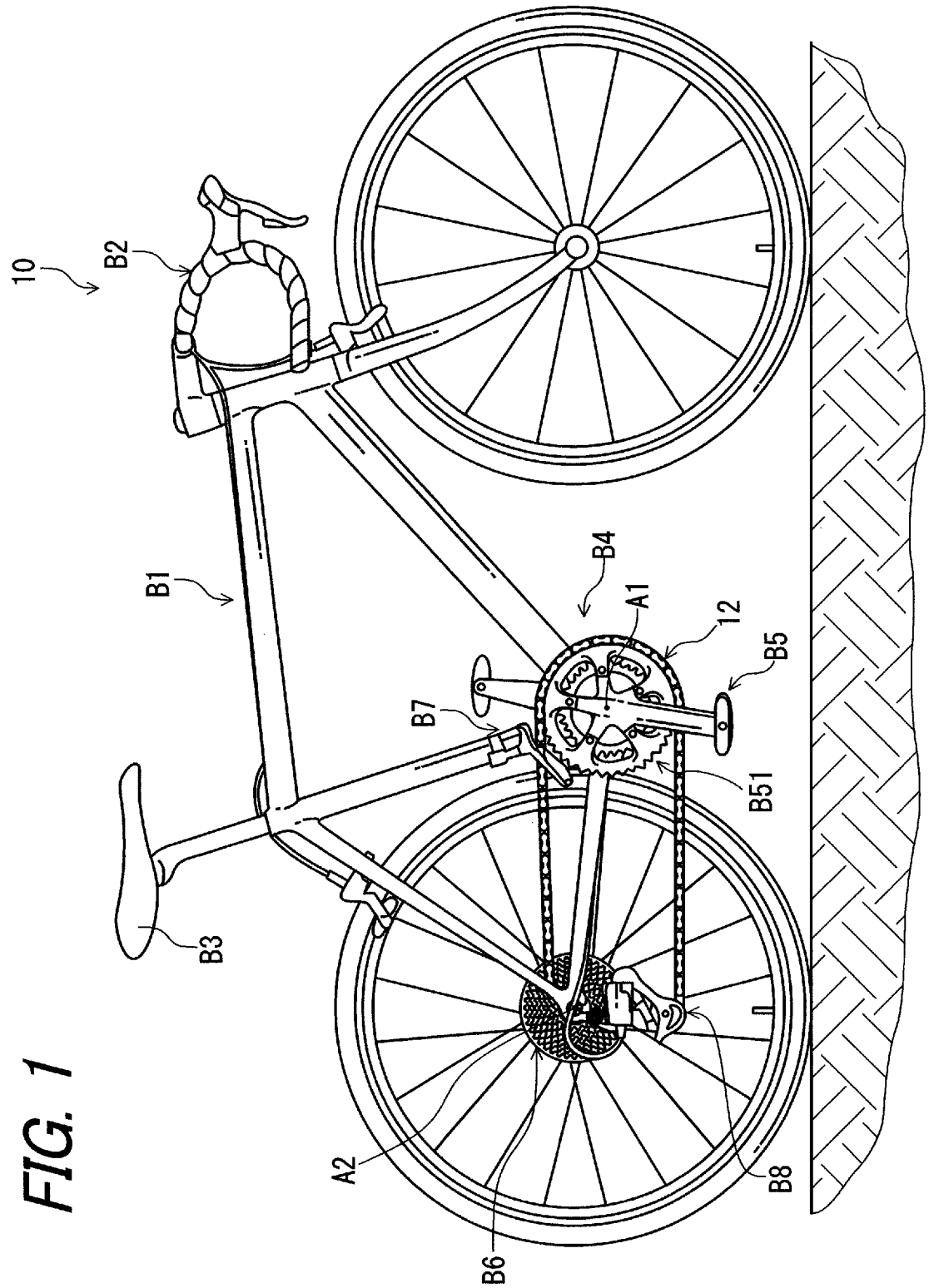
FIG. 1 is a side elevational view of a bicycle having a drive train that uses a bicycle chain in accordance with an embodiment.

The embodiment(s) will now be described with reference to the accompanying drawings, wherein like reference numerals designate corresponding or identical elements throughout the various drawings.

Referring initially to FIG. 1, a bicycle 10 is illustrated to be equipped with a bicycle chain 12 in accordance with an embodiment. The bicycle 10 includes a bicycle frame B1, a handlebar B2, a saddle B3, and a drive train B4. The drive train B4 is configured to convert the rider's pedaling force into driving force. The bicycle chain 12 is a part of the drive train B4. The drive train B4 also includes a bicycle crank assembly B5, a rear sprocket B6, a front derailleur B7, and a rear derailleur B8. The bicycle crank assembly B5 includes a front sprocket B51. The bicycle crank assembly B5 is rotatably mounted on a bottom bracket of the bicycle frame B1 about a rotational center axis A1. The rear sprocket B6 is rotatably mounted to the bicycle frame B1 about a rotational center axis A2. The bicycle chain 12 is arranged on the front sprocket B51 and the rear sprocket B6 so as to extend therebetween. The front derailleur B7 and the rear derailleur B8 are configured and arranged to change gears by shifting the bicycle chain 12 in a transverse direction of the bicycle 10. The front sprocket B51 can also be referred to as a bicycle sprocket B51. The rear sprocket B6 can also be referred to as a bicycle sprocket B6.

In the present application, the following directional terms "front," "rear," "forward," "rearward," "left," "right," "transverse," "upward" and "downward" as well as any other similar directional terms refer to those directions which are determined on the basis of the rider who sits on the saddle B3 of the bicycle 10 with facing the handlebar B2, for example. Accordingly, these terms, as utilized to describe the bicycle 10 including the bicycle chain 12 should be interpreted relative to the bicycle 10 as used in an upright riding position on a horizontal surface as illustrated in FIG. 1. These terms, as utilized to describe the bicycle chain 12, should be interpreted relative to the bicycle chain 12 as mounted on the bicycle 10 used in an upright riding position on a horizontal surface as illustrated in FIG. 1.

Figure 2:
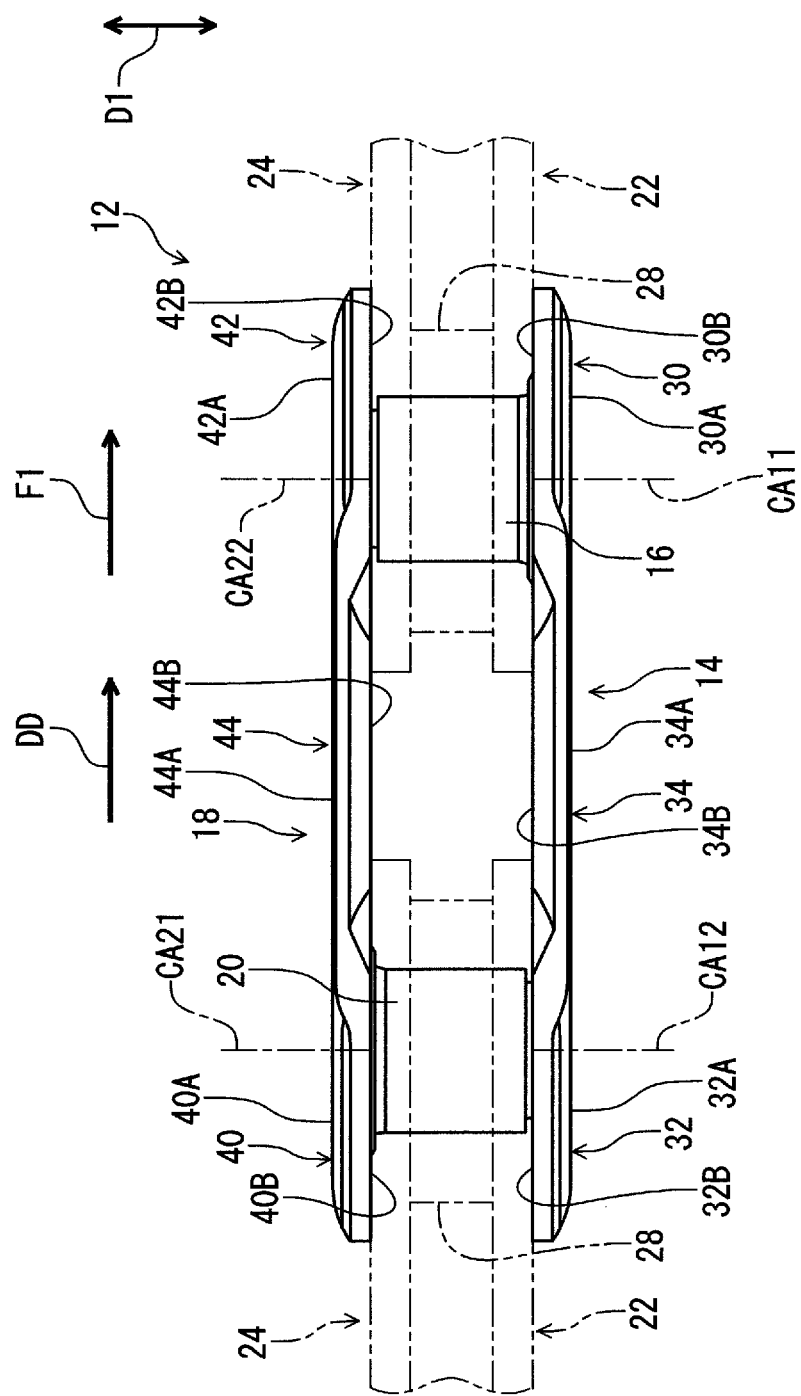
FIG. 2 is a partial plan view of the bicycle chain illustrated in FIG. 1.

As seen in FIG. 2, the bicycle chain 12 comprises a bicycle-chain outer link plate 14 and a first link pin 16. The bicycle chain 12 comprises an additional outer link plate 18, a second link pin 20, a first inner link plate 22, and a second inner link plate 24, and a roller 28. The bicycle-chain outer link plate 14 is spaced apart from the additional outer link plate 18. The first inner link plate 22 and the second inner link plate 24 are provided between the bicycle-chain outer link plate 14 and the additional outer link plate 18. The roller 28 is provided between the first inner link plate 22 and the second inner link plate 24. The bicycle chain 12 has a driving direction DD in which the bicycle chain 12 transmits a pedaling force F1 during pedaling. The bicycle-chain outer link plate 14 can also be referred to as a first outer link plate 14. The additional outer link plate 18 can also be referred to as a second outer link plate 18.

In this embodiment, the bicycle-chain outer link plate 14 and the additional outer link plate 18 are connector link plates to connect one end of a chain to the other end of the chain. Thus, the bicycle-chain outer link plate 14 can also be referred to as a first connector link plate 14. The additional outer link plate 18 can also be referred to as a second connector link plate 18. However, the bicycle-chain outer link plate 14 and the additional outer link plate 18 are not limited to a connector link plate. The bicycle-chain outer link plate 14 and the additional outer link plate 18 can be an outer link plate.

Figure 3:
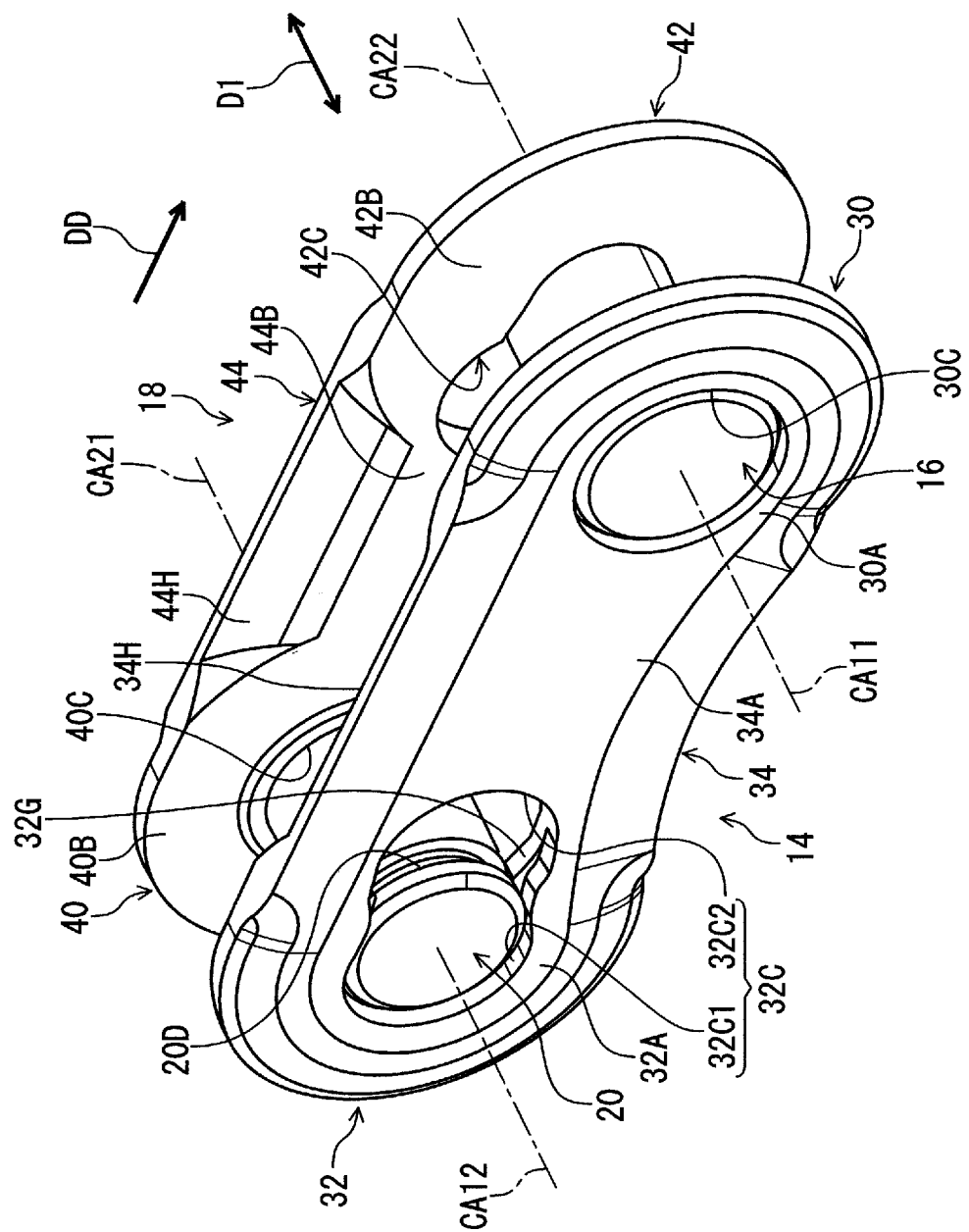
FIG. 3 is a partial perspective view of the bicycle chain illustrated in FIG. 1.
Figure 4:
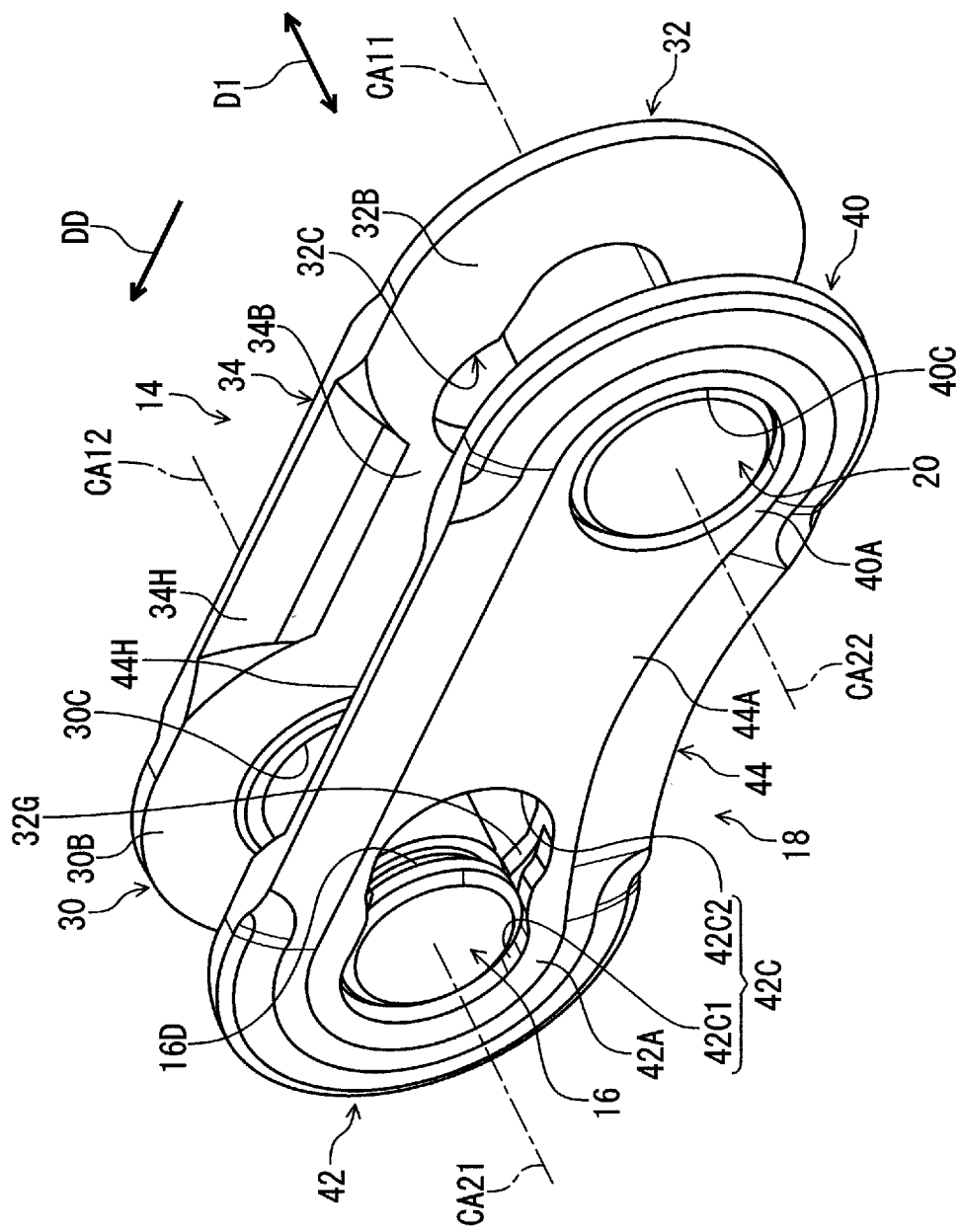
FIG. 4 is another partial perspective view of the bicycle chain illustrated in FIG. 1.

As seen in FIGS. 3 and 4, the bicycle-chain outer link plate 14 comprises a first outer-link end portion 30, a second outer-link end portion 32, and a first outer-link intermediate portion 34. The first outer-link intermediate portion 34 interconnects the first outer-link end portion 30 and the second outer-link end portion 32. The first outer-link intermediate portion 34 is provided between the first outer-link end portion 30 and the second outer-link end portion 32.

As seen in FIG. 2, the first outer-link end portion 30 comprises a first outer surface 30A and a first inner surface 30B. The first inner surface 30B is provided on a reverse side of the first outer surface 30A to face toward the additional outer link plate 18 in an assembled state where the bicycle-chain outer link plate 14 and the additional outer link plate 18 are assembled. The second outer-link end portion 32 comprises a second outer surface 32A and a second inner surface 32B. The second inner surface 32B is provided on a reverse side of the second outer surface 32A to face toward the additional outer link plate 18 in the assembled state. The first outer-link intermediate portion 34 comprises a first intermediate outer surface 34A and a first intermediate inner surface 34B. The first intermediate inner surface 34B is provided on a reverse side of the first intermediate outer surface 34A to face toward the additional outer link plate 18 in the assembled state.

Figure 5:
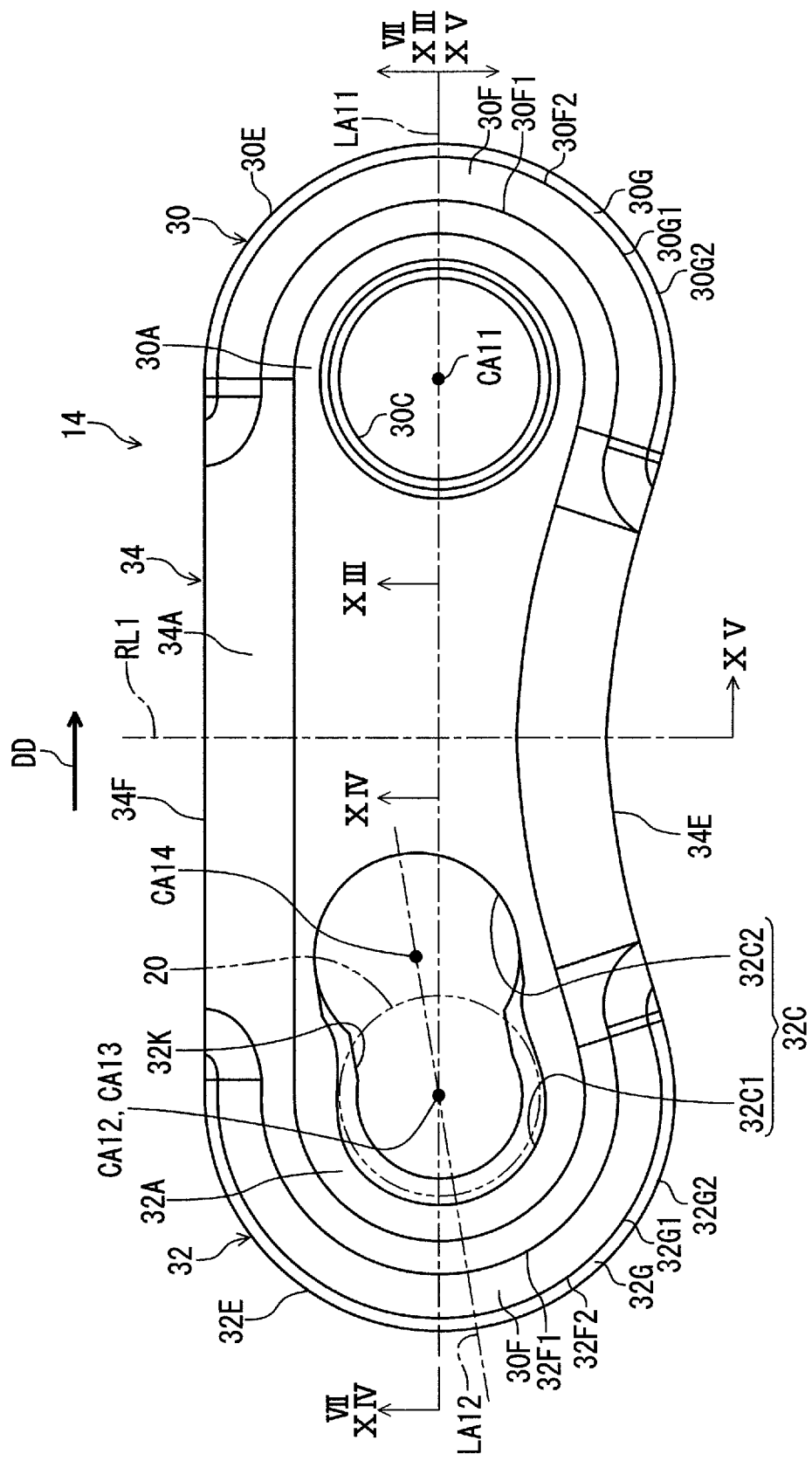
FIG. 5 is a side elevational view of a bicycle-chain outer link plate of the bicycle chain illustrated in FIG. 1.

As seen in FIG. 5, the first outer-link end portion 30 comprises a first outer-link opening 30C having a first outer-link center axis CA11. The first outer-link end portion 30 comprises a first outer-link end outermost edge 30E provided radially outwardly of the first outer-link opening 30C. The second outer-link end portion 32 comprises a second outer-link opening 32C having a second outer-link center axis CA12. The second outer-link end portion 32 comprises a second outer-link end outermost edge 32E provided radially outwardly of the second outer-link opening 32C. The first outer-link intermediate portion 34 comprises a first outer-link intermediate outermost edge 34E and a first additional outer-link intermediate outermost edge 34F.

The first outer-link intermediate outermost edge 34E is provided between the first outer-link end outermost edge 30E and the second outer-link end outermost edge 32E. The first additional outer-link intermediate outermost edge 34F is provided between the first outer-link end outermost edge 30E and the second outer-link end outermost edge 32E.

The bicycle-chain outer link plate 14 comprises a first outer-link longitudinal axis LA11 extending from the first outer-link center axis CA11 to the second outer-link center axis CA12 when viewed in the axial direction D1 (FIG. 2) parallel to the first outer-link center axis CA11. The bicycle-chain outer link plate 14 further comprises an outline having an asymmetric shape relative to the first outer-link longitudinal axis LA11 when viewed in the axial direction D1 (FIG. 2). However, the outline of the bicycle-chain outer link plate 14 can have a symmetric shape relative to the first outer-link longitudinal axis LA11 when viewed in the axial direction D1.

Figure 6:
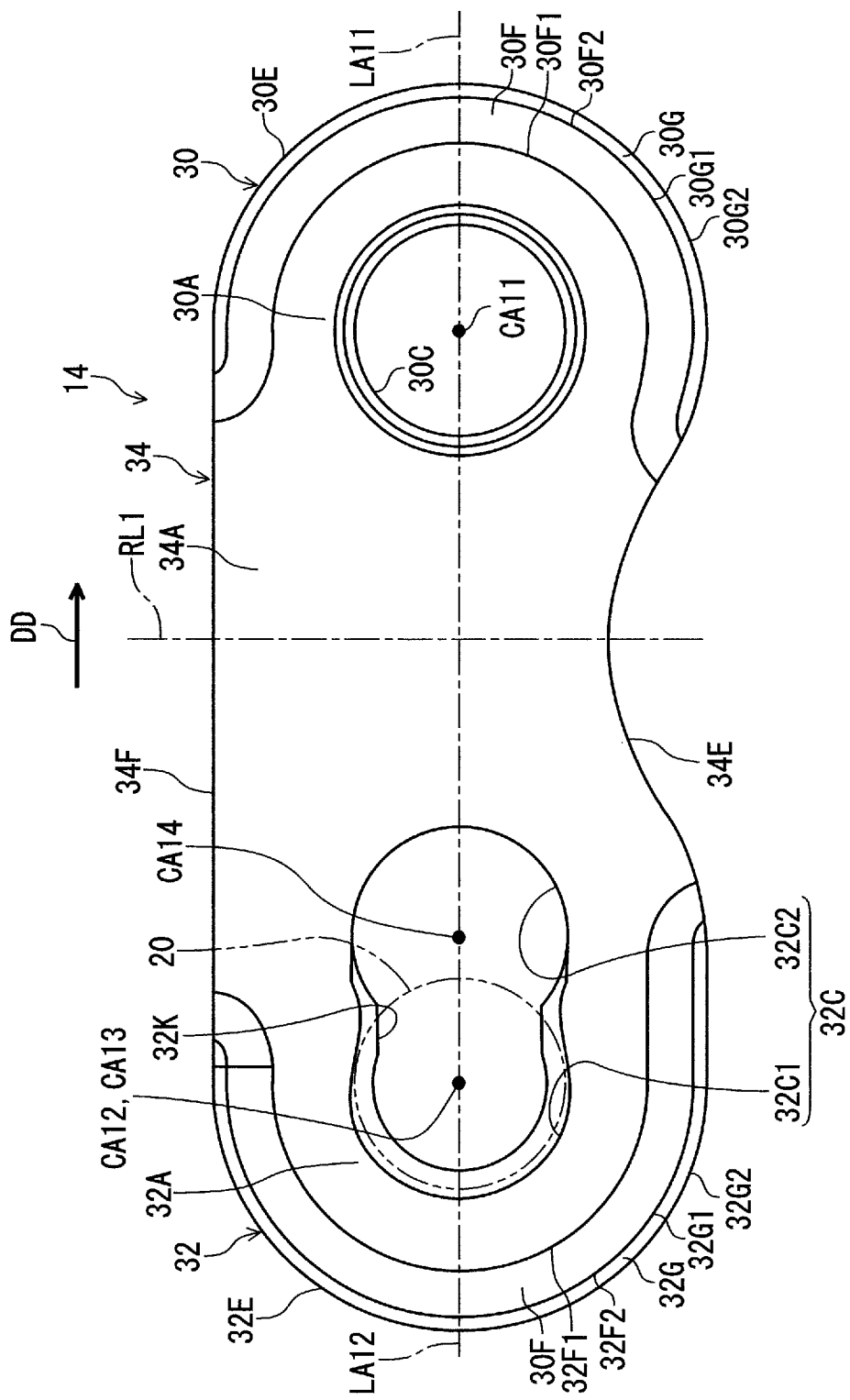
FIG. 6 is a side elevational view of a bicycle-chain outer link plate in accordance with a modification of the embodiment.

In this embodiment, the first outer-link opening 30C has a circular shape. The second outer-link opening 32C has an elongated shape extending along the first outer-link longitudinal axis LA11. The second outer-link opening 32C has a longitudinal axis LA12. The longitudinal axis LA12 of the second outer-link opening 32C is inclined relative to the first outer-link longitudinal axis LA11 when viewed in the axial direction D1. As seen in FIG. 6, however, the longitudinal axis LA12 of the second outer-link opening 32C can be parallel to the first outer-link longitudinal axis LA11 when viewed in the axial direction D1.

As seen in FIG. 5, the second outer-link opening 32C includes an attachment opening 32C1 and an insertion opening 32C2. The attachment opening 32C1 is connected to the insertion opening 32C2. The attachment opening 32C1 has an attachment center axis CA13. The insertion opening 32C2 has an insertion center axis CA14. The longitudinal axis LA12 of the second outer-link opening 32C extends from the attachment center axis CA13 to the insertion center axis CA14 when viewed in the axial direction D1 (FIG. 2). In this embodiment, the second outer-link center axis CA12 is coincident with the attachment center axis CA13. However, the second outer-link center axis CA12 can be offset from the attachment center axis CA13.

Figure 7:
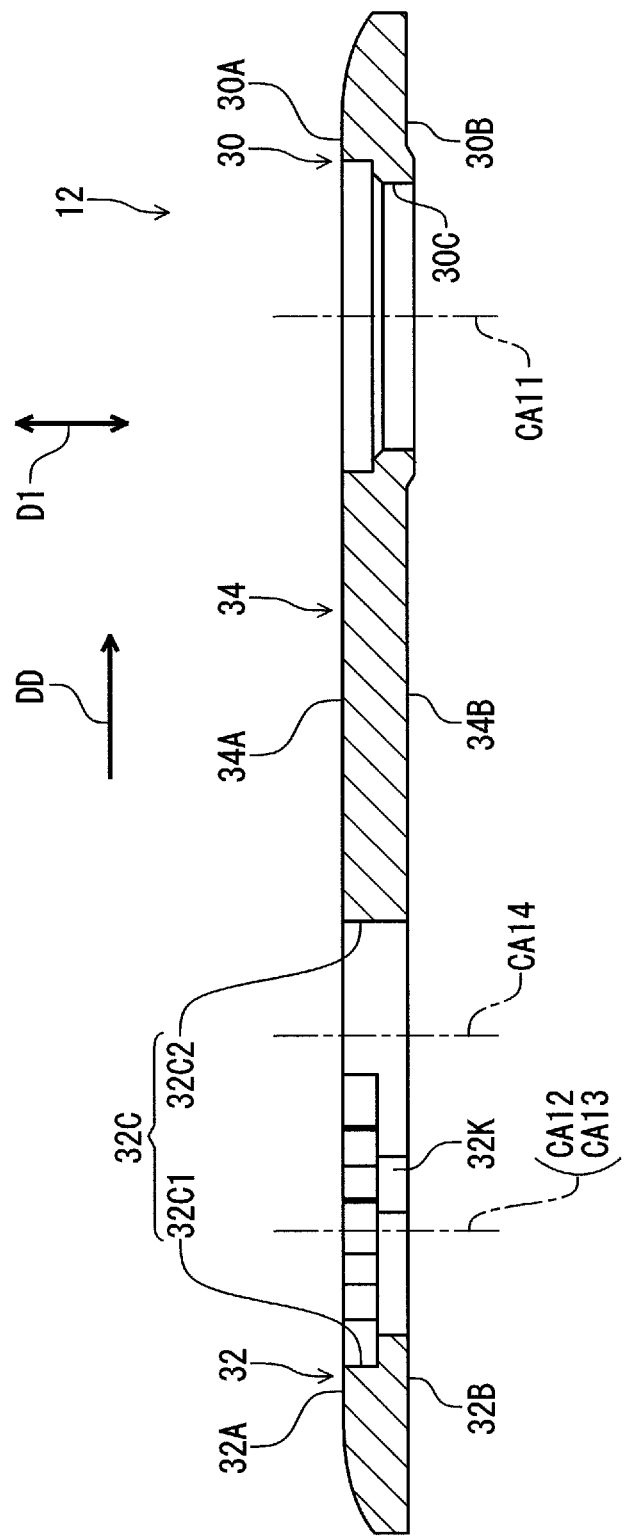
FIG. 7 is a cross-sectional view of the bicycle-chain outer link plate taken along line XII-XII of the FIG. 5.

As seen in FIG. 7, the first outer-link opening 30C extends from the first outer surface 30A to the first inner surface 30B along the first outer-link center axis CA11. The second outer-link opening 32C extends from the second outer surface 32A to the second inner surface 32B.

As seen in FIGS. 3 and 4, the additional outer link plate 18 comprises a third outer-link end portion 40, a fourth outer-link end portion 42, and a second outer-link intermediate portion 44. The second outer-link intermediate portion 44 interconnects the third outer-link end portion 40 and the fourth outer-link end portion 42. The second outer-link intermediate portion 44 is provided between the third outer-link end portion 40 and the fourth outer-link end portion 42.

As seen in FIG. 2, the third outer-link end portion 40 comprises a third outer surface 40A and a third inner surface 40B. The third inner surface 40B is provided on a reverse side of the third outer surface 40A to face toward the additional outer link plate 18 in the assembled state where the bicycle-chain outer link plate 14 and the additional outer link plate 18 are assembled. The fourth outer-link end portion 42 comprises a fourth outer surface 42A and a fourth inner surface 42B. The fourth inner surface 42B is provided on a reverse side of the fourth outer surface 42A to face toward the additional outer link plate 18 in the assembled state. The second outer-link intermediate portion 44 comprises a second intermediate outer surface 44A and a second intermediate inner surface 44B. The second intermediate inner surface 44B is provided on a reverse side of the second intermediate outer surface 44A to face toward the additional outer link plate 18 in the assembled state.

Figure 8:
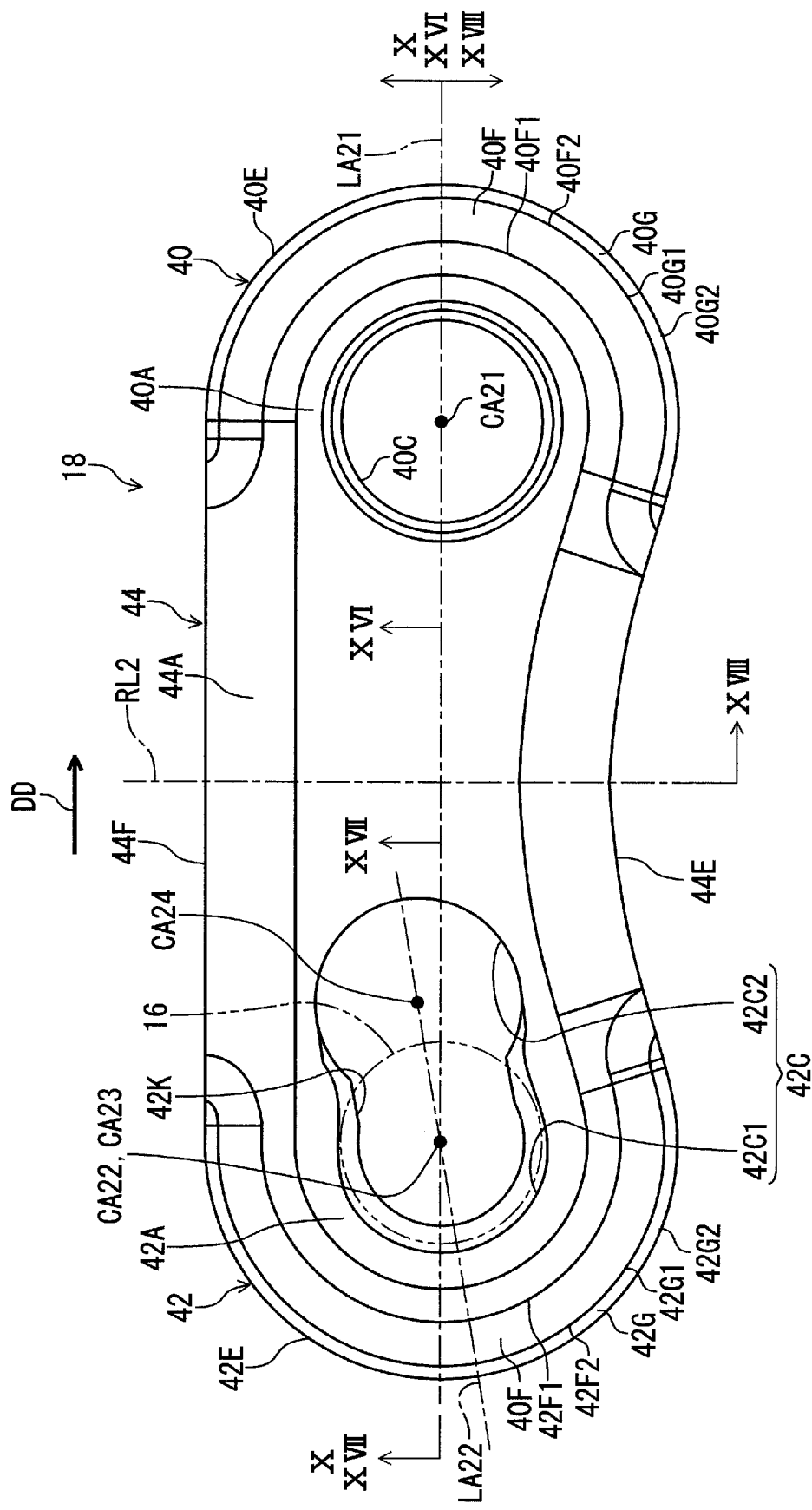
FIG. 8 is a side elevational view of an additional outer link plate of the bicycle chain illustrated in FIG. 1.

As seen in FIG. 8, the third outer-link end portion 40 comprises a third outer-link opening 40C having a third outer-link center axis CA21. The third outer-link end portion 40 comprises a third outer-link end outermost edge 40E provided radially outwardly of the third outer-link opening 40C. The fourth outer-link end portion 42 comprises a fourth outer-link opening 42C having a fourth outer-link center axis CA22. The fourth outer-link end portion 42 comprises a fourth outer-link end outermost edge 42E provided radially outwardly of the fourth outer-link opening 42C. The second outer-link intermediate portion 44 comprises a second outer-link intermediate outermost edge 44E and a second additional outer-link intermediate outermost edge 44F. The second outer-link intermediate outermost edge 44E is provided between the third outer-link end outermost edge 40E and the fourth outer-link end outermost edge 42E. The second additional outer-link intermediate outermost edge 44F is provided between the third outer-link end outermost edge 40E and the fourth outer-link end outermost edge 42E.

The additional outer link plate 18 comprises a second outer-link longitudinal axis LA21 extending from the third outer-link center axis CA21 to the fourth outer-link center axis CA22 when viewed in the axial direction D1. The additional outer link plate 18 further comprises an outline having an asymmetric shape relative to the second outer-link longitudinal axis LA21 when viewed in the axial direction D1. However, the outline of the additional outer link plate 18 can have a symmetric shape relative to the second outer-link longitudinal axis LA21 when viewed in the axial direction D1.

Figure 9:
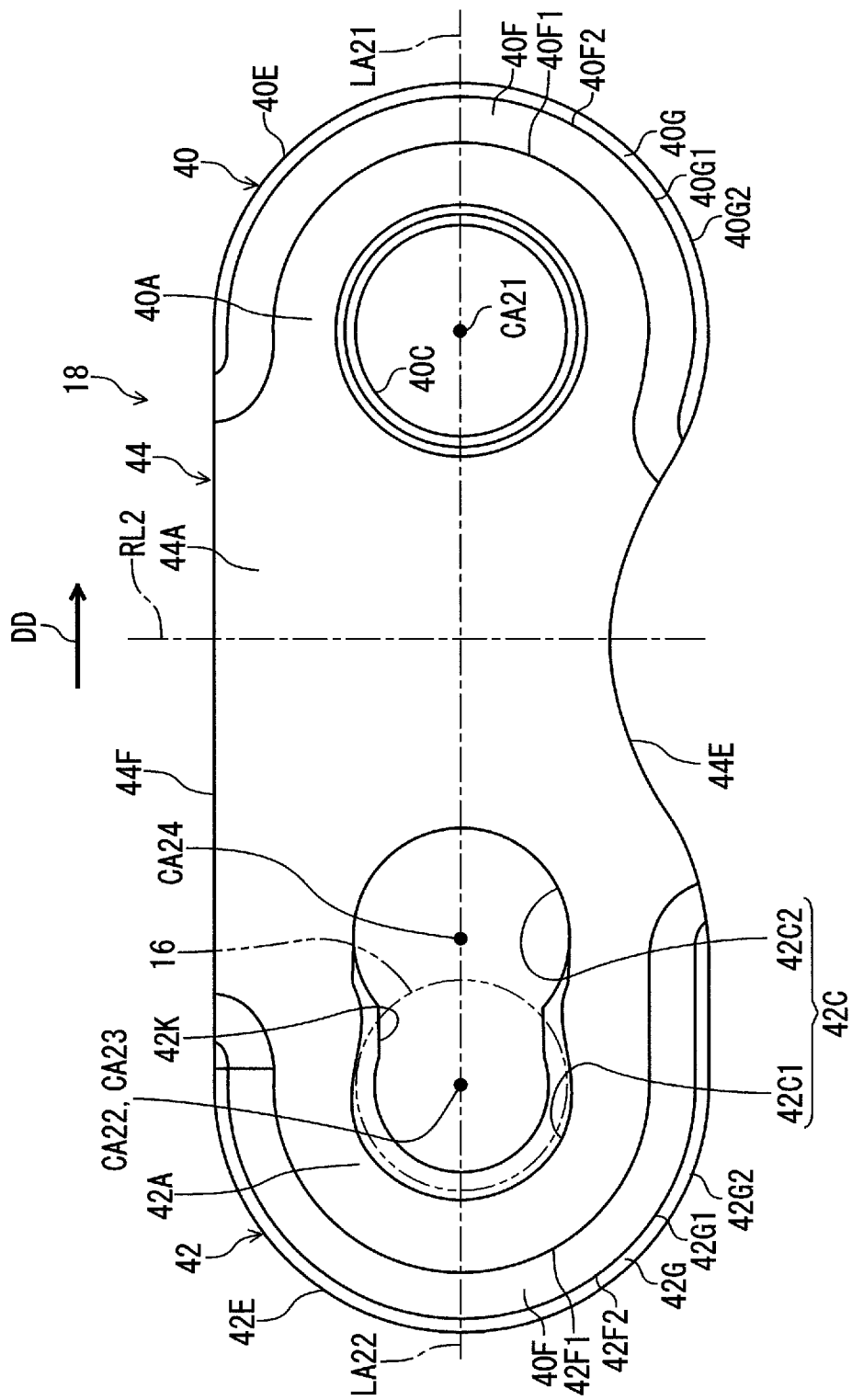
FIG. 9 is a side elevational view of an additional outer link plate in accordance with a modification of the embodiment.

In this embodiment, the third outer-link opening 40C has a circular shape. The fourth outer-link opening 42C has an elongated shape extending along the second outer-link longitudinal axis LA21. The fourth outer-link opening 42C has a longitudinal axis LA22. The longitudinal axis LA22 of the fourth outer-link opening 42C is inclined relative to the second outer-link longitudinal axis LA21 when viewed in the axial direction D1. As seen in FIG. 9, however, the longitudinal axis LA22 of the fourth outer-link opening 42C can be parallel to the second outer-link longitudinal axis LA21 when viewed in the axial direction D1.

As seen in FIG. 8, the fourth outer-link opening 42C includes an attachment opening 42C1 and an insertion opening 42C2. The attachment opening 42C1 is connected to the insertion opening 42C2. The attachment opening 42C1 has an attachment center axis CA23. The insertion opening 42C2 has an insertion center axis CA14. The longitudinal axis LA22 of the fourth outer-link opening 42C extends from the attachment center axis CA23 to the insertion center axis CA14. In this embodiment, the fourth outer-link center axis CA22 is coincident with the attachment center axis CA23. However, the fourth outer-link center axis CA22 can be offset from the attachment center axis CA23.

Figure 10:
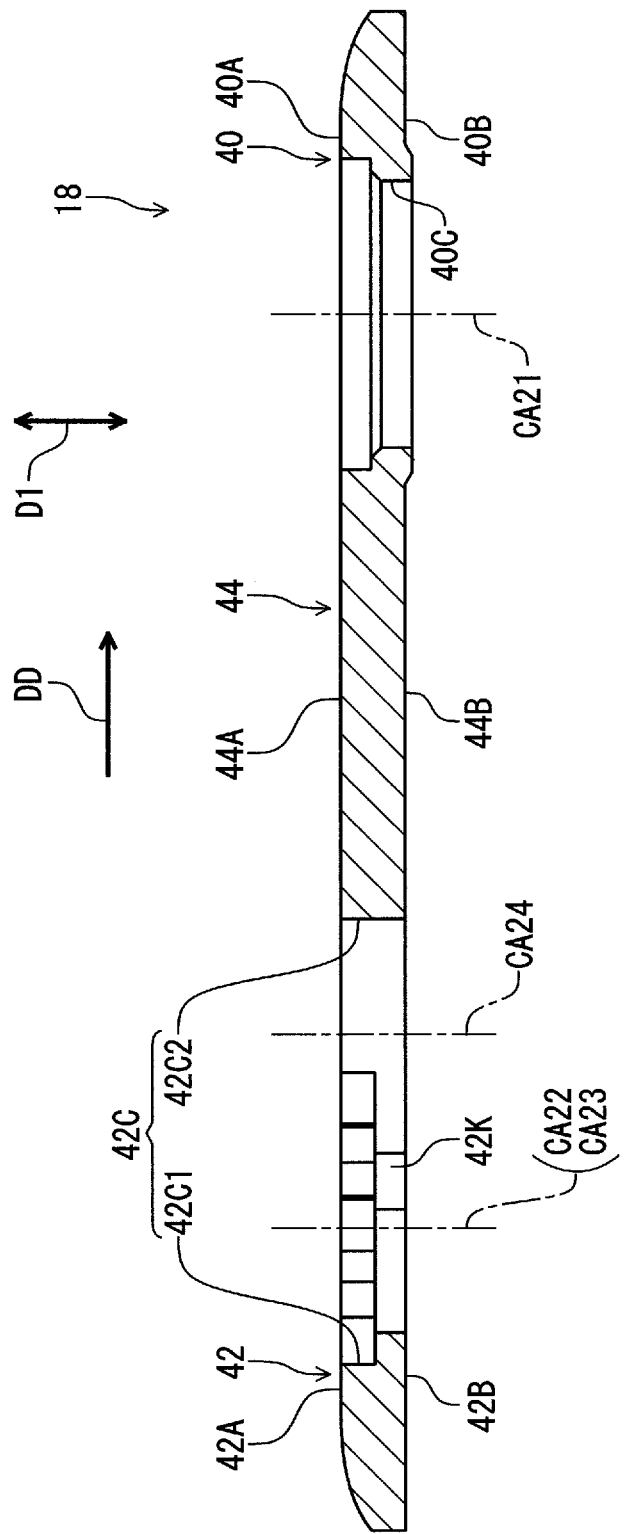
FIG. 10 is a cross-sectional view of the additional outer link plate taken along line X-X of the FIG. 8.

As seen in FIG. 10, the third outer-link opening 40C extends from the third outer surface 40A to the third inner surface 40B along the third outer-link center axis CA21. The fourth outer-link opening 42C extends from the fourth outer surface 42A to the fourth inner surface 42B.

As seen in FIG. 3, the first link pin 16 is provided in the first outer-link opening 30C. The first link pin 16 is engaged with the additional outer link plate 18. The second link pin 20 is provided in the second outer-link opening 32C. The second link pin 20 is engaged with the additional outer link plate 18. As seen in FIG. 4, the first link pin 16 is provided in the fourth outer-link opening 42C. The second link pin 20 is provided in the third outer-link opening 40C.

As seen in FIG. 2, the first inner link plate 22 and the second inner link plate 24 are pivotally coupled to the bicycle-chain outer link plate 14 and the additional outer link plate 18 with the first link pin 16. The first inner link plate 22 and the second inner link plate 24 are pivotally coupled to the bicycle-chain outer link plate 14 and the additional outer link plate 18 with the second link pin 20.

Figure 11:
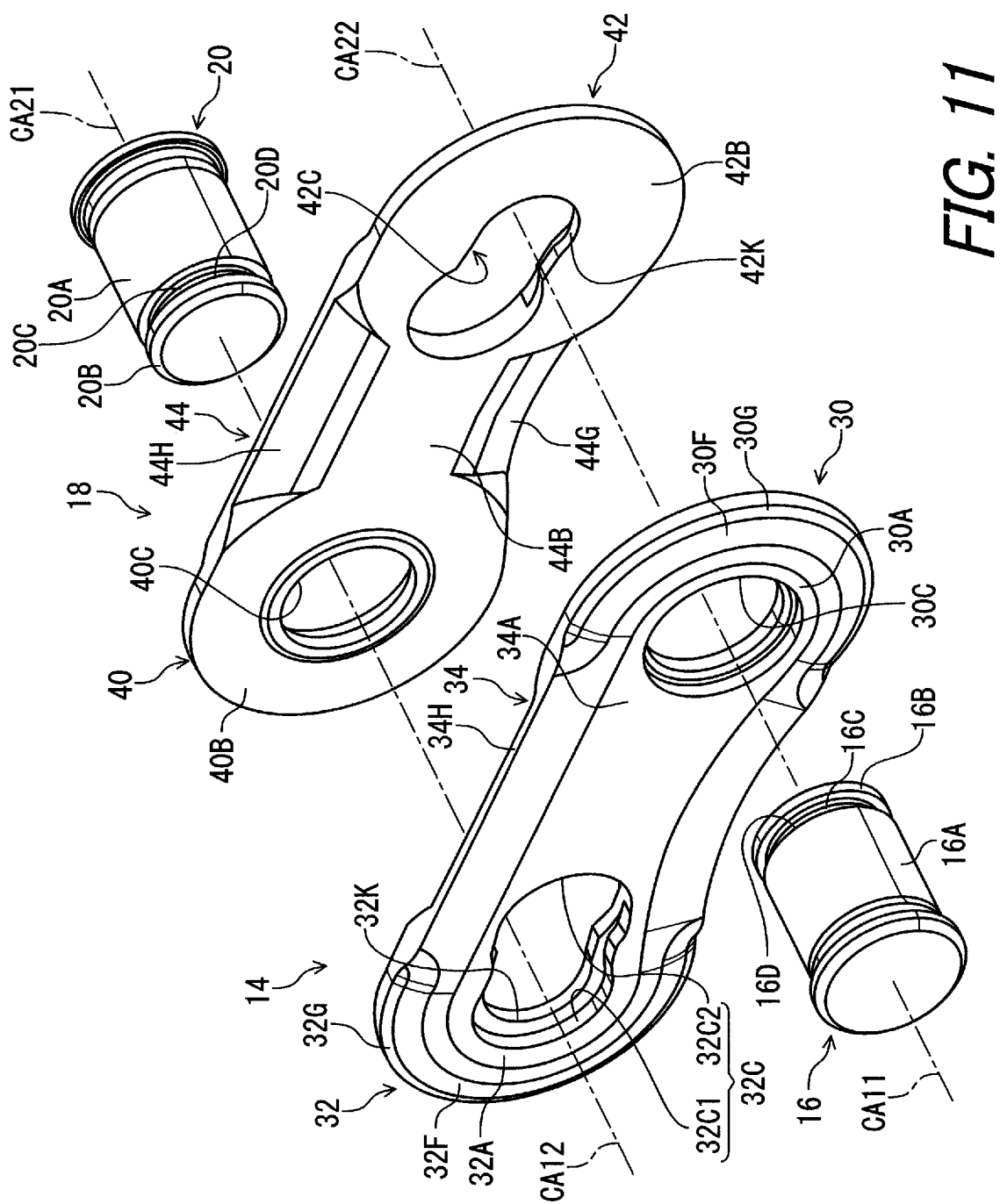
FIG. 11 is a partial exploded perspective view of the bicycle chain illustrated in FIG. 1.

As seen in FIG. 11, the first link pin 16 includes a first pin body 16A, a first head part 16B, a first intermediate part 16C, and a first groove 16D. The first pin body 16A is provided in the first outer-link opening 30C. In this embodiment, for example, the first pin body 16A is press-fitted in the first outer-link opening 30C. The first intermediate part 16C couples the first head part 16B to the first pin body 16A. The first groove 16D is provided between the first pin body 16A and the first head part 16B. The first intermediate part 16C is provided in the fourth outer-link opening 42C.

Figure 12:
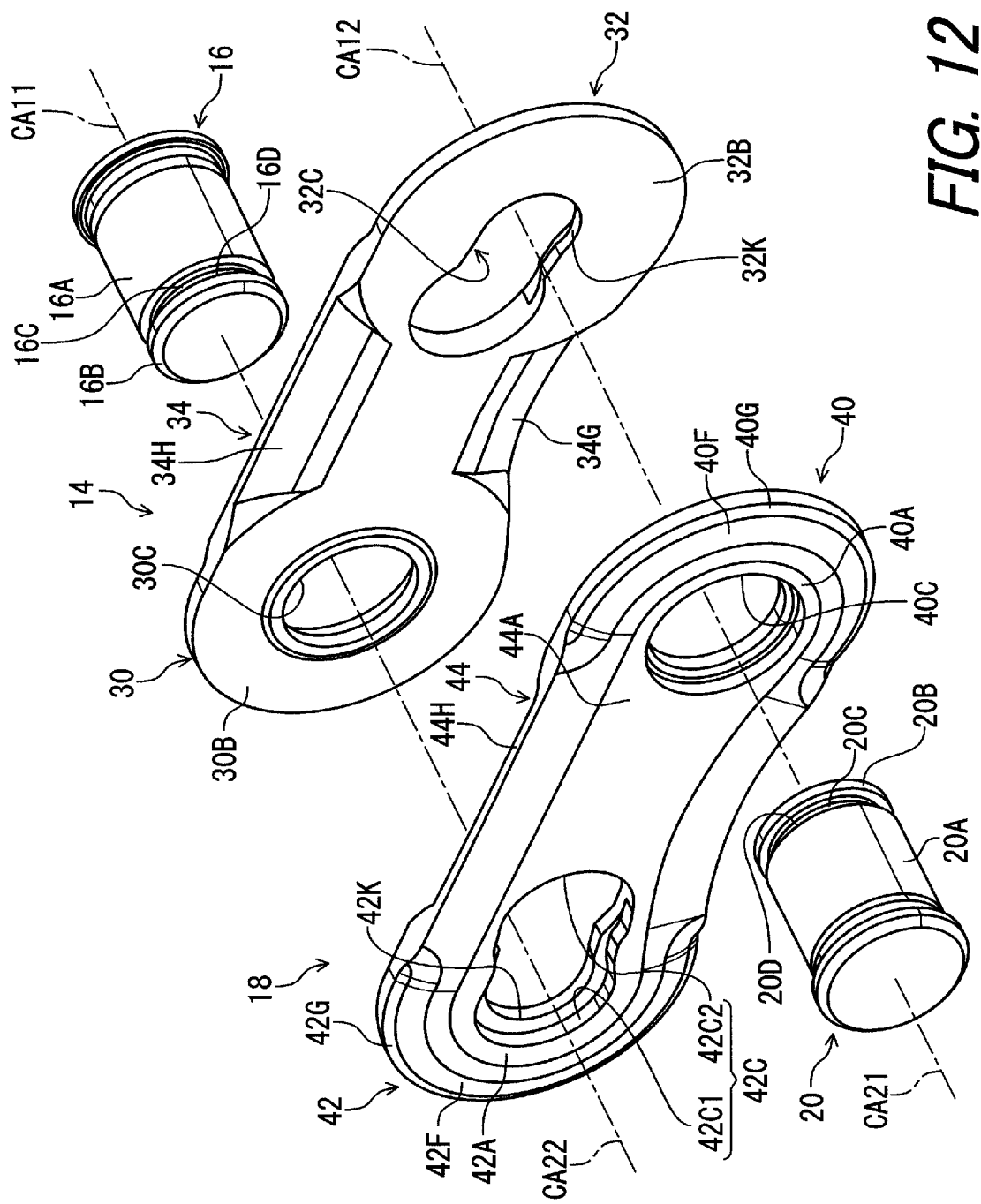
FIG. 12 is another partial exploded perspective view of the bicycle chain illustrated in FIG. 1.

As seen in FIG. 12, the additional outer link plate 18 includes a guide part 42K provided in the fourth outer-link opening 42C. The guide part 42K extends from an inner peripheral surface of the fourth outer-link opening 42C. As seen in FIG. 4, the guide part 42K is provided in the first groove 16D of the first link pin 16 in the assembled state.

As seen in FIG. 12, the second link pin 20 includes a second pin body 20A, a second head part 20B, a second intermediate part 20C, and a second groove 20D. The second pin body 20A is provided in the third outer-link opening 40C. In this embodiment, for example, the second pin body 20A is press-fitted in the third outer-link opening 40C. The second intermediate part 20C couples the second head part 20B to the second pin body 20A. The second groove 20D is provided between the second pin body 20A and the second head part 20B. The second intermediate part 20C is provided in the second opening.

As seen in FIG. 11, the bicycle-chain outer link plate 14 includes a guide part 32K provided in the second outer-link opening 32C. The guide part 32K extends from an inner peripheral surface of the second outer-link opening 32C. As seen in FIG. 3, the guide part 32K is provided in the second groove 20D of the second link pin 20 in the assembled state.

As seen in FIG. 5, the first outer-link end portion 30 includes a first outer-link end chamfer 30F and a first additional outer-link end chamfer 30G. The first outer-link end chamfer 30F is provided on the first outer surface 30A. The first additional outer-link end chamfer 30G is provided on the first outer surface 30A. The first outer-link end chamfer 30F extends along the first outer-link end outermost edge 30E. The first additional outer-link end chamfer 30G extends along the first outer-link end outermost edge 30E. The first additional outer-link end chamfer 30G is provided between the first outer-link end outermost edge 30E and the first outer-link end chamfer 30F. In this embodiment, the first outer-link end chamfer 30F is adjacent to the first additional outer-link end chamfer 30G without another chamfer between the first outer-link end chamfer 30F and the first additional outer-link end chamfer 30G. However, another chamfer can be provided between the first outer-link end chamfer 30F and the first additional outer-link end chamfer 30G.

Figure 13:
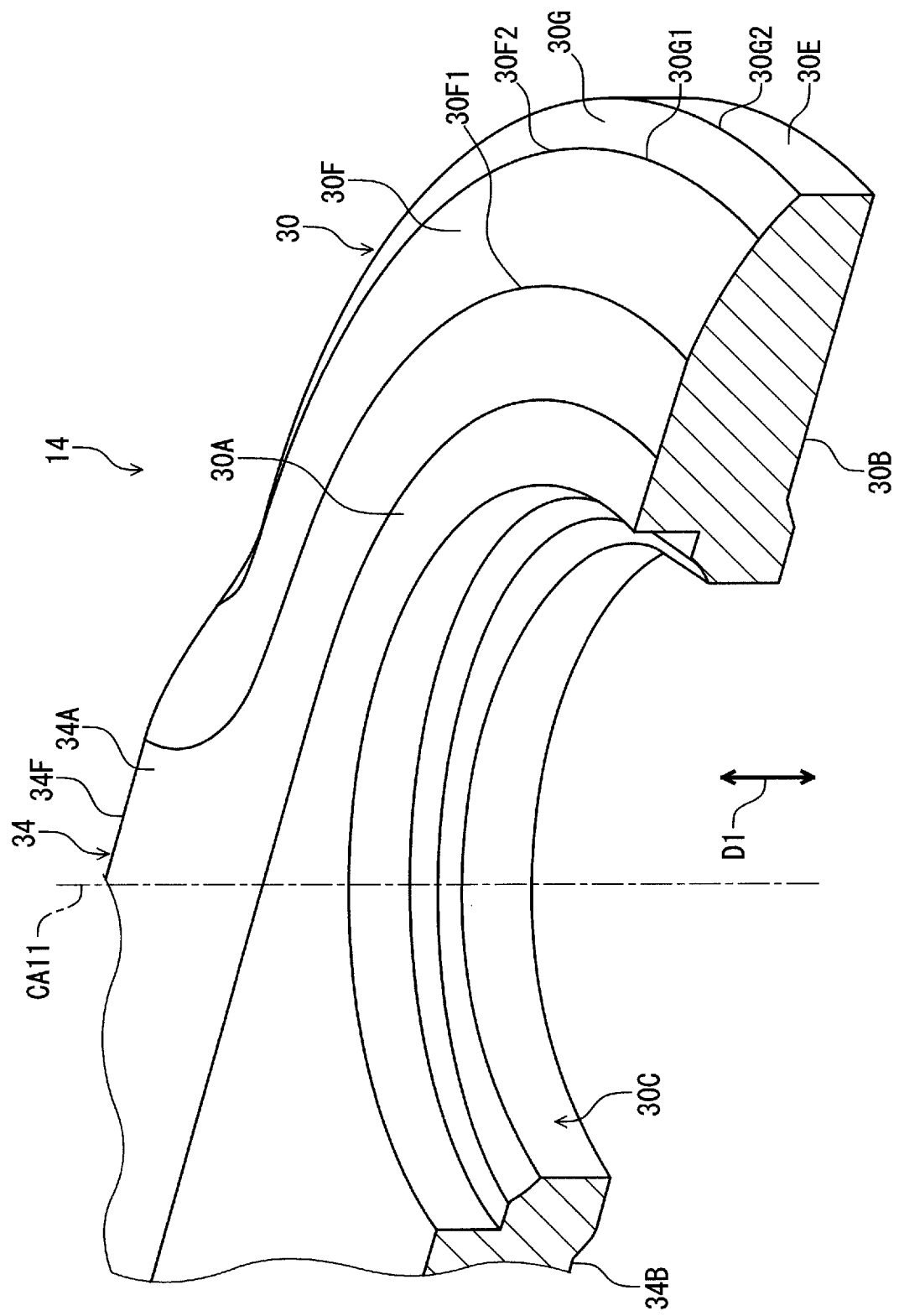
FIG. 13 is a partial perspective cross-sectional view of the bicycle-chain outer link plate taken along line XIII-XIII of the FIG. 5.

As seen in FIG. 13, the first outer-link end chamfer 30F includes a first radially outer edge 30F1 and a first radially inner edge 30F2. The first additional outer-link end chamfer 30G includes a first additional radially outer edge 30G1 and a first additional radially inner edge 30G2. The first radially inner edge 30F2 is coincident with the first additional radially outer edge 30G1. However, the first radially inner edge 30F2 can be offset from the first additional radially outer edge 30G1.

As seen in FIG. 5, the second outer-link end portion 32 includes a second outer-link end chamfer 32F and a second additional outer-link end chamfer 32G. The second outer-link end chamfer 32F is provided on the second outer surface 32A. The second additional outer-link end chamfer 32G is provided on the second outer surface 32A. The second outer-link end chamfer 32F extends along the second outer-link end outermost edge 32E. The second additional outer-link end chamfer 32G extends along the second outer-link end outermost edge 32E. The second additional outer-link end chamfer 32G is provided between the second outer-link end outermost edge 32E and the second outer-link end chamfer 32F. In this embodiment, the second outer-link end chamfer 32F is adjacent to the second additional outer-link end chamfer 32G without another chamfer between the second outer-link end chamfer 32F and the second additional outer-link end chamfer 32G. However, another chamfer can be provided between the second outer-link end chamfer 32F and the second additional outer-link end chamfer 32G.

Figure 14:
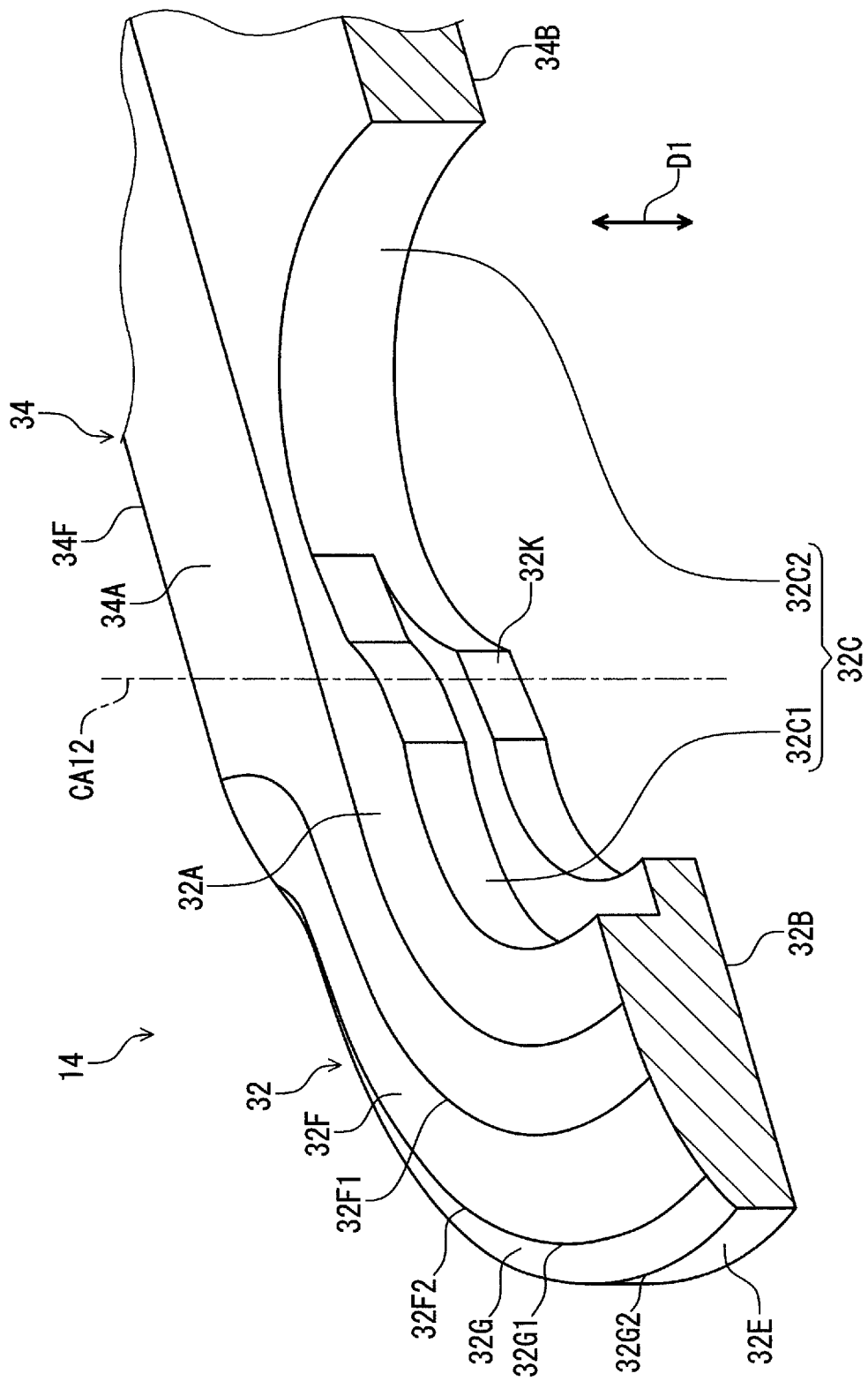
FIG. 14 is another partial perspective cross-sectional view of the bicycle-chain outer link plate taken along line XIV-XIV of the FIG. 5.

As seen in FIG. 14, the second outer-link end chamfer 32F includes a second radially outer edge 32F1 and a second radially inner edge 32F2. The second additional outer-link end chamfer 32G includes a second additional radially outer edge 32G1 and a second additional radially inner edge 32G2. The second radially inner edge 32F2 is coincident with the second additional radially outer edge 32G1. However, the second radially inner edge 32F2 can be offset from the second additional radially outer edge 32G1.

Figure 15:
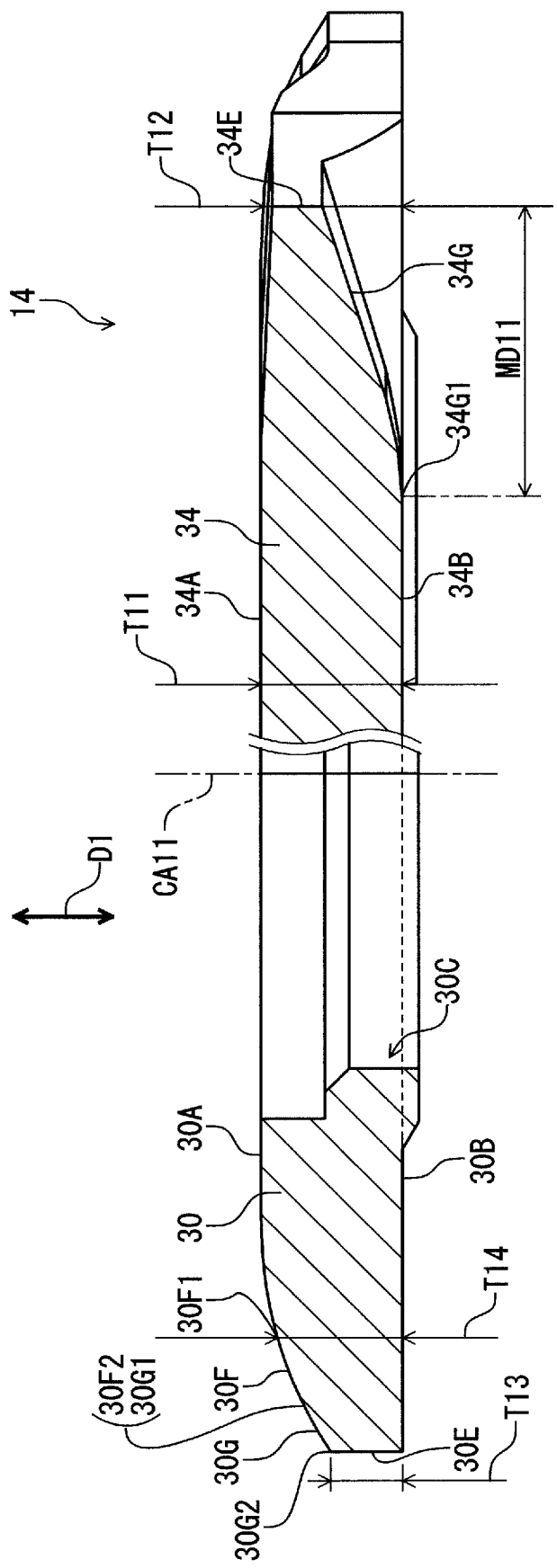
FIG. 15 is a cross-sectional view of the bicycle-chain outer link plate taken along line XV-XV of the FIG. 5.

As seen in FIG. 15, the first outer-link intermediate portion 34 has a first distance T11 defined in an axial direction D1 parallel to the first outer-link center axis CA11 on the first outer-link longitudinal axis LA11. The first outer-link intermediate outermost edge 34E has a second distance T12 defined in the axial direction D1. The first outer-link end outermost edge 30E has a third distance T13 defined in the axial direction D1. The first distance T11 is larger than the second distance T12 and the third distance T13. The second distance T12 is larger than the third distance T13. In this embodiment, each of the first distance T11, the second distance T12, the third distance T13, and the fourth distance T14 is defined from the first intermediate inner surface 34B in the axial direction D1.

In this embodiment, the first distance T11 ranges from 0.87 mm to 0.91 mm. The second distance T12 ranges from 0.79 mm to 0.83 mm. The third distance T13 ranges from 0.44 mm to 0.48 mm. In this embodiment, the first distance T11 is 0.89 mm. The second distance T12 is 0.81 mm. The third distance T13 is 0.46 mm. However, each of the first distance T11, the second distance T12, and the third distance T13 is not limited to this embodiment and the above ranges. The second distance T12 ranges from 89% to 93% of the first distance T11. In this embodiment, the second distance T12 is approximately 91% of the first distance T11. However, a ratio of the second distance T12 to the first distance T11 is not limited to this embodiment.

The first outer-link end portion 30 has a fourth distance T14 defined at the first radially outer edge 30F1 of the first outer-link end chamfer 30F in the axial direction D1. The fourth distance T14 ranges from 0.79 mm to 0.83 mm. In this embodiment, the fourth distance T14 is 0.81 mm. Namely, the second distance T12 corresponds to the fourth distance T14. The second distance T12 is equal to the fourth distance T14. However, the fourth distance T14 is not limited to this embodiment and the above ranges. The fourth distance T14 can be different from the second distance T12.

As seen in FIG. 8, the third outer-link end portion 40 includes a third outer-link end chamfer 40F and a third additional outer-link end chamfer 40G. The third outer-link end chamfer 40F is provided on the third outer surface 40A. The third additional outer-link end chamfer 40G is provided on the third outer surface 40A. The third outer-link end chamfer 40F extends along the third outer-link end outermost edge 40E. The third additional outer-link end chamfer 40G extends along the third outer-link end outermost edge 40E. The third additional outer-link end chamfer 40G is provided between the third outer-link end outermost edge 40E and the third outer-link end chamfer 40F. In this embodiment, the third outer-link end chamfer 40F is adjacent to the third additional outer-link end chamfer 40G without another chamfer between the third outer-link end chamfer 40F and the third additional outer-link end chamfer 40G. However, another chamfer can be provided between the third outer-link end chamfer 40F and the third additional outer-link end chamfer 40G.

Figure 16:
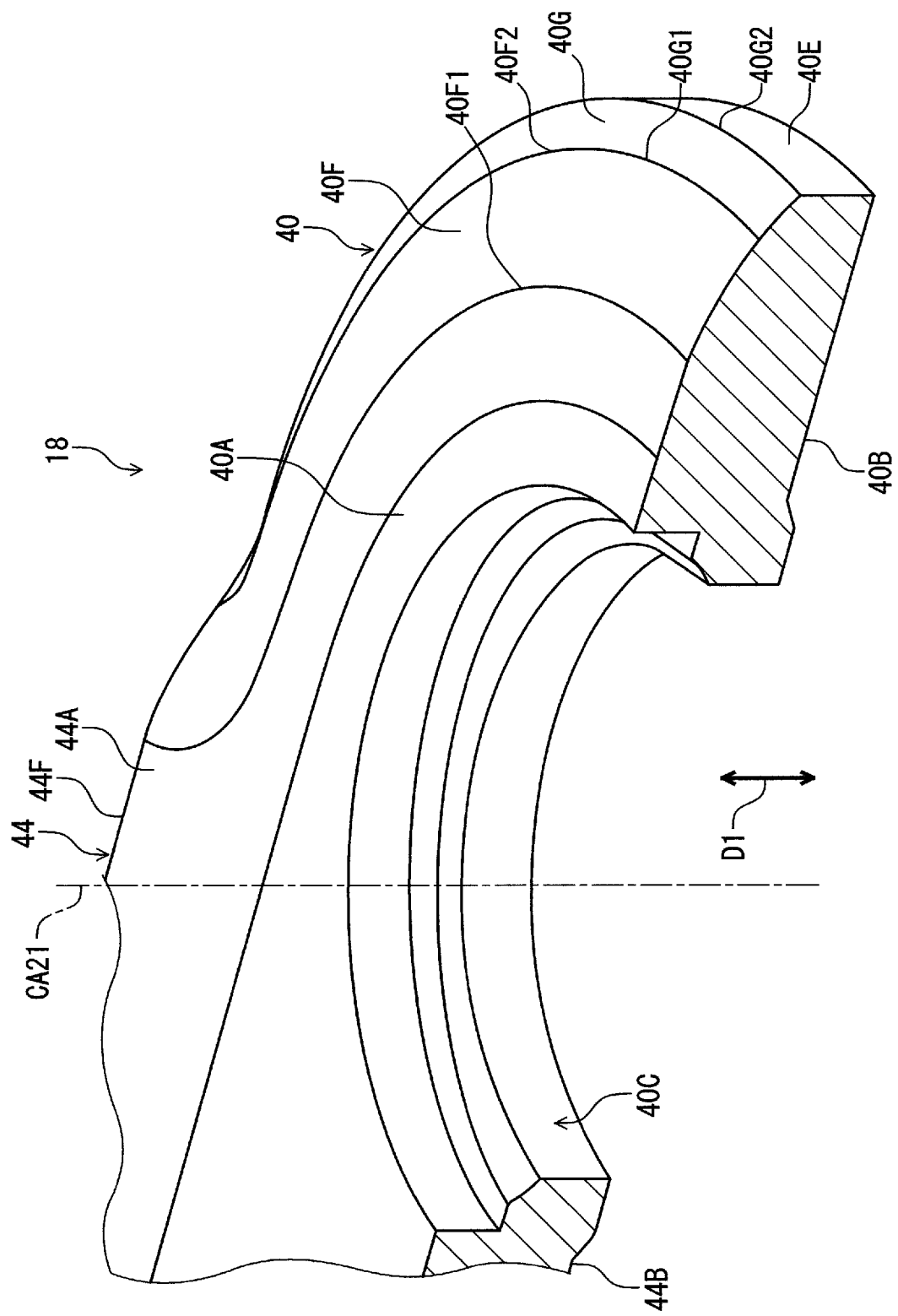
FIG. 16 is a partial perspective cross-sectional view of the additional outer link plate taken along line XVI-XVI of the FIG. 8.

As seen in FIG. 16, the third outer-link end chamfer 40F includes a third radially outer edge 40F1 and a third radially inner edge 40F2. The third additional outer-link end chamfer 40G includes a third additional radially outer edge 40G1 and a third additional radially inner edge 40G2. The third radially inner edge 40F2 is coincident with the third additional radially outer edge 40G1. However, the third radially inner edge 40F2 can be offset from the third additional radially outer edge 40G1.

As seen in FIG. 8, the fourth outer-link end portion 42 includes a fourth outer-link end chamfer 42F and a fourth additional outer-link end chamfer 42G. The fourth outer-link end chamfer 42F is provided on the fourth outer surface 42A. The fourth additional outer-link end chamfer 42G is provided on the fourth outer surface 42A. The fourth outer-link end chamfer 42F extends along the fourth outer-link end outermost edge 42E. The fourth additional outer-link end chamfer 42G extends along the fourth outer-link end outermost edge 42E. The fourth additional outer-link end chamfer 42G is provided between the fourth outer-link end outermost edge 42E and the fourth outer-link end chamfer 42F. In this embodiment, the fourth outer-link end chamfer 42F is adjacent to the fourth additional outer-link end chamfer 42G without another chamfer between the fourth outer-link end chamfer 42F and the fourth additional outer-link end chamfer 42G. However, another chamfer can be provided between the fourth outer-link end chamfer 42F and the fourth additional outer-link end chamfer 42G.

Figure 17:
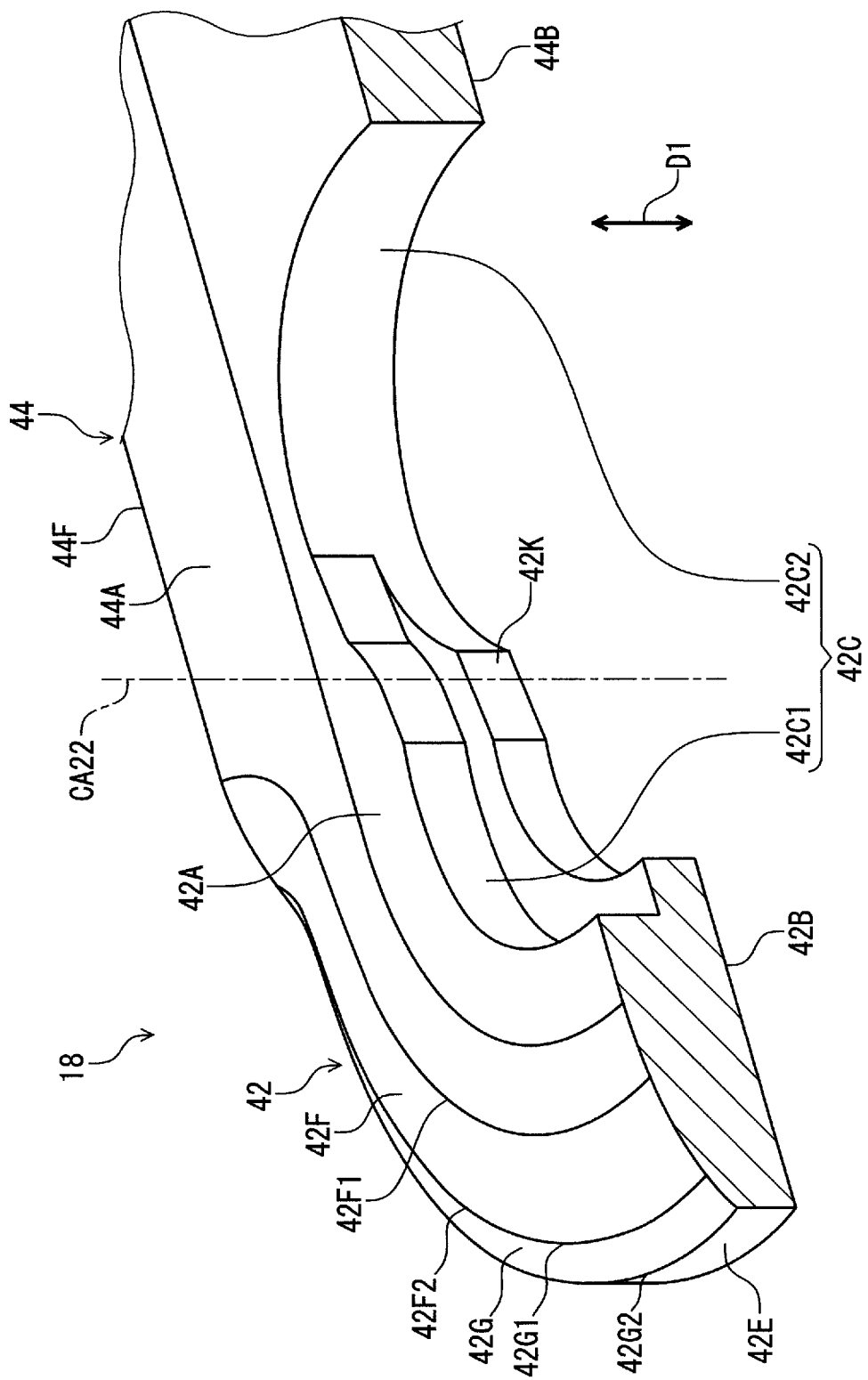
FIG. 17 is another partial perspective cross-sectional view of the additional outer link plate taken along line XVII-XVII of the FIG. 8.

As seen in FIG. 17, the fourth outer-link end chamfer 42F includes a fourth radially outer edge 42F1 and a fourth radially inner edge 42F2. The fourth additional outer-link end chamfer 42G includes a fourth additional radially outer edge 42G1 and a fourth additional radially inner edge 42G2. The fourth radially inner edge 42F2 is coincident with the fourth additional radially outer edge 42G1. However, the fourth radially inner edge 42F2 can be offset from the fourth additional radially outer edge 42G1.

Figure 18:
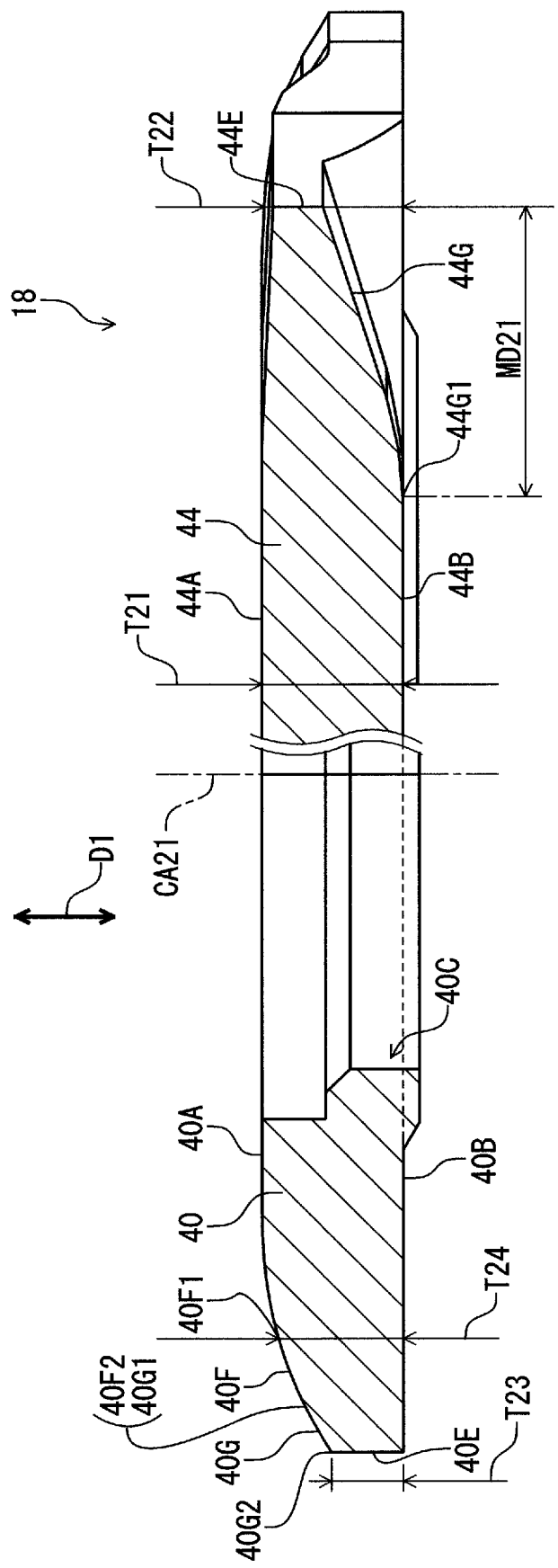
FIG. 18 is a partial perspective cross-sectional view of the additional outer link plate taken along line XVIII-XVIII of the FIG. 8.

As seen in FIG. 18, the second outer-link intermediate portion 44 has a first distance T21 defined in the axial direction D1 parallel to the third outer-link center axis CA21 on the second outer-link longitudinal axis LA21. The second outer-link intermediate outermost edge 44E has a second distance T22 defined in the axial direction D1. The third outer-link end outermost edge 40E has a third distance T23 defined in the axial direction D1. The first distance T21 is larger than the second distance T22 and the third distance T23. The second distance T22 is larger than the third distance T23. In this embodiment, each of the first distance T21, the second distance T22, the third distance T23, and the fourth distance T24 is defined from the second intermediate inner surface 44B in the axial direction D1.

In this embodiment, the first distance T21 ranges from 0.87 mm to 0.91 mm. The second distance T22 ranges from 0.79 mm to 0.83 mm. The third distance T23 ranges from 0.44 mm to 0.48 mm. In this embodiment, the first distance T21 is 0.89 mm. The second distance T22 is 0.81 mm. The third distance T23 is 0.46 mm. However, each of the first distance T21, the second distance T22, and the third distance T23 is not limited to this embodiment and the above ranges. The second distance T22 ranges from 89% to 93% of the first distance T21. In this embodiment, the second distance T22 is approximately 91% of the first distance T21. However, a ratio of the second distance T22 to the first distance T21 is not limited to this embodiment.

The third outer-link end portion 40 has a fourth distance T24 defined at the third radially outer edge 40F1 of the third outer-link end chamfer 40F in the axial direction D1. The fourth distance T24 ranges from 0.79 mm to 0.83 mm. In this embodiment, the fourth distance T24 is 0.81 mm. Namely, the second distance T22 corresponds to the fourth distance T24. The second distance T22 is equal to the fourth distance T24. However, the fourth distance T24 is not limited to this embodiment and the above ranges. The fourth distance T24 can be different from the second distance T22.

Figure 19:
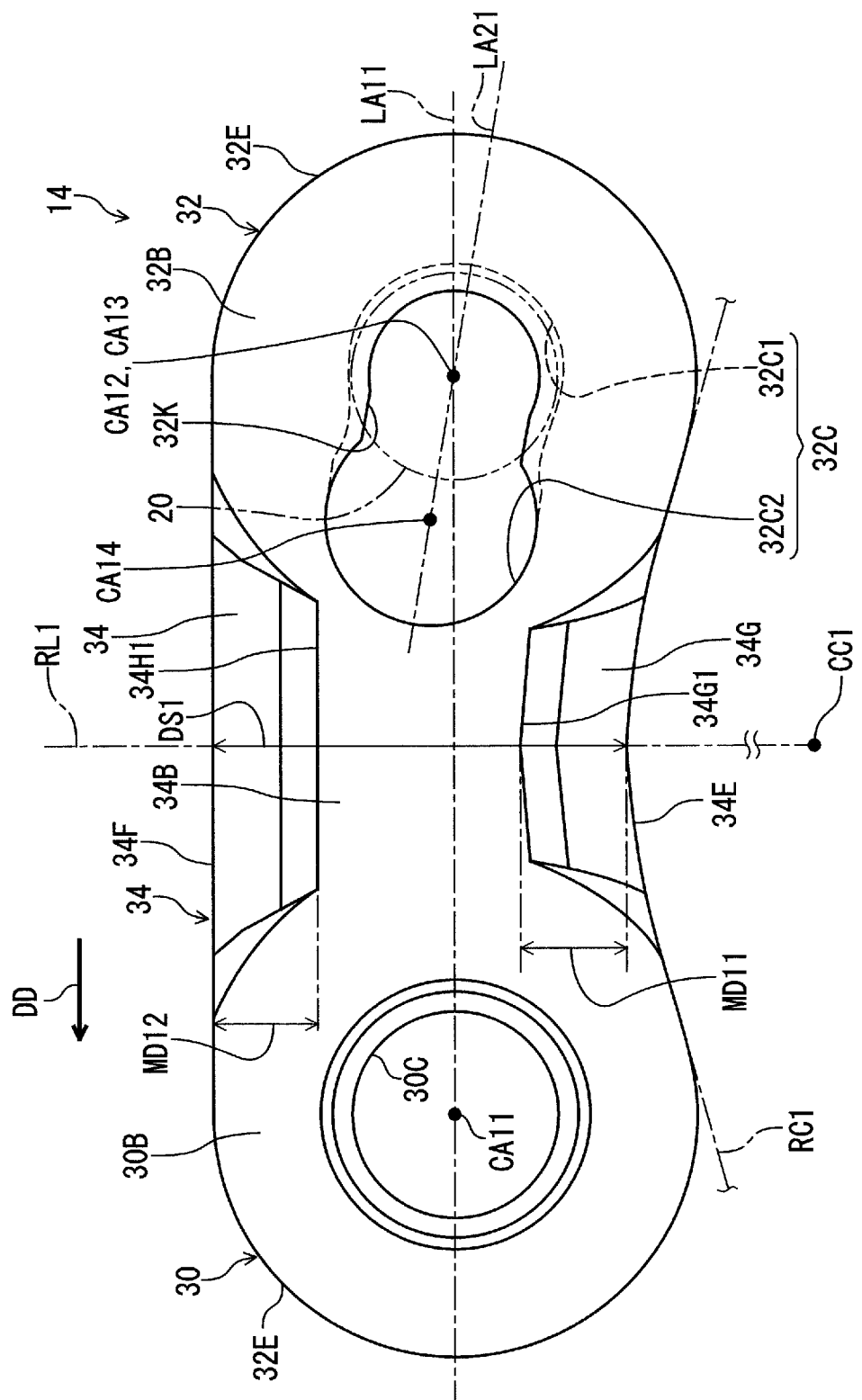
FIG. 19 is another side elevational view of the bicycle-chain outer link plate illustrated in FIG. 5.

As seen in FIG. 19, the first outer-link intermediate portion 34 comprises a first intermediate chamfer 34G extending along the first outer-link intermediate outermost edge 34E. The first intermediate chamfer 34G has a first inner edge 34G1. The first intermediate chamfer 34G is provided between the first outer-link intermediate outermost edge 34E and the first inner edge 34G1. The first intermediate chamfer 34G extends from the first outer-link intermediate outermost edge 34E toward the first additional outer-link intermediate outermost edge 34F. The first intermediate chamfer 34G is provided on the first intermediate inner surface 34B and is disposed between the first outer-link end portion 30 and the second outer-link end portion 32.

The first intermediate chamfer 34G has a first minimum distance MD11 defined between the first outer-link intermediate outermost edge 34E and the first inner edge 34G1 along a reference line RL1. The reference line RL1 is perpendicular to a first outer-link longitudinal axis LA11. The first outer-link longitudinal axis LA11 extends from the first outer-link center axis CA11 to the second outer-link center axis CA12 when viewed in the axial direction D1 parallel to the first outer-link center axis CA11. A distance DS1 defined between the first outer-link intermediate outermost edge 34E and the first additional outer-link intermediate outermost edge 34F on the reference line RL1 is minimum in the first outer-link intermediate portion 34. The reference line RL1 extends from a center of curvature CC1 of a reference circular arc RC1 corresponding to the first outer-link intermediate outermost edge 34E when viewed in the axial direction D1. The first minimum distance MD11 is equal to or larger than 1 mm. The first minimum distance MD11 is equal to or smaller than 2 mm. In this embodiment, the first minimum distance MD11 is 1.5 mm. However, the first minimum distance MD11 is not limited to this embodiment and the above ranges.

The first outer-link intermediate portion 34 includes a first additional intermediate chamfer 34H extending along the first additional outer-link intermediate outermost edge 34F. The first additional intermediate chamfer 34H has a first additional inner edge 34H1. The first additional intermediate chamfer 34H is provided between the first additional outer-link intermediate outermost edge 34F and the first additional inner edge 34H1. The first additional intermediate chamfer 34H extends from the first additional outer-link intermediate outermost edge 34F toward the first outer-link intermediate outermost edge 34E. The first additional intermediate chamfer 34H is provided on the first intermediate inner surface 34B and is disposed between the first outer-link end portion 30 and the second outer-link end portion 32.

Figure 20:
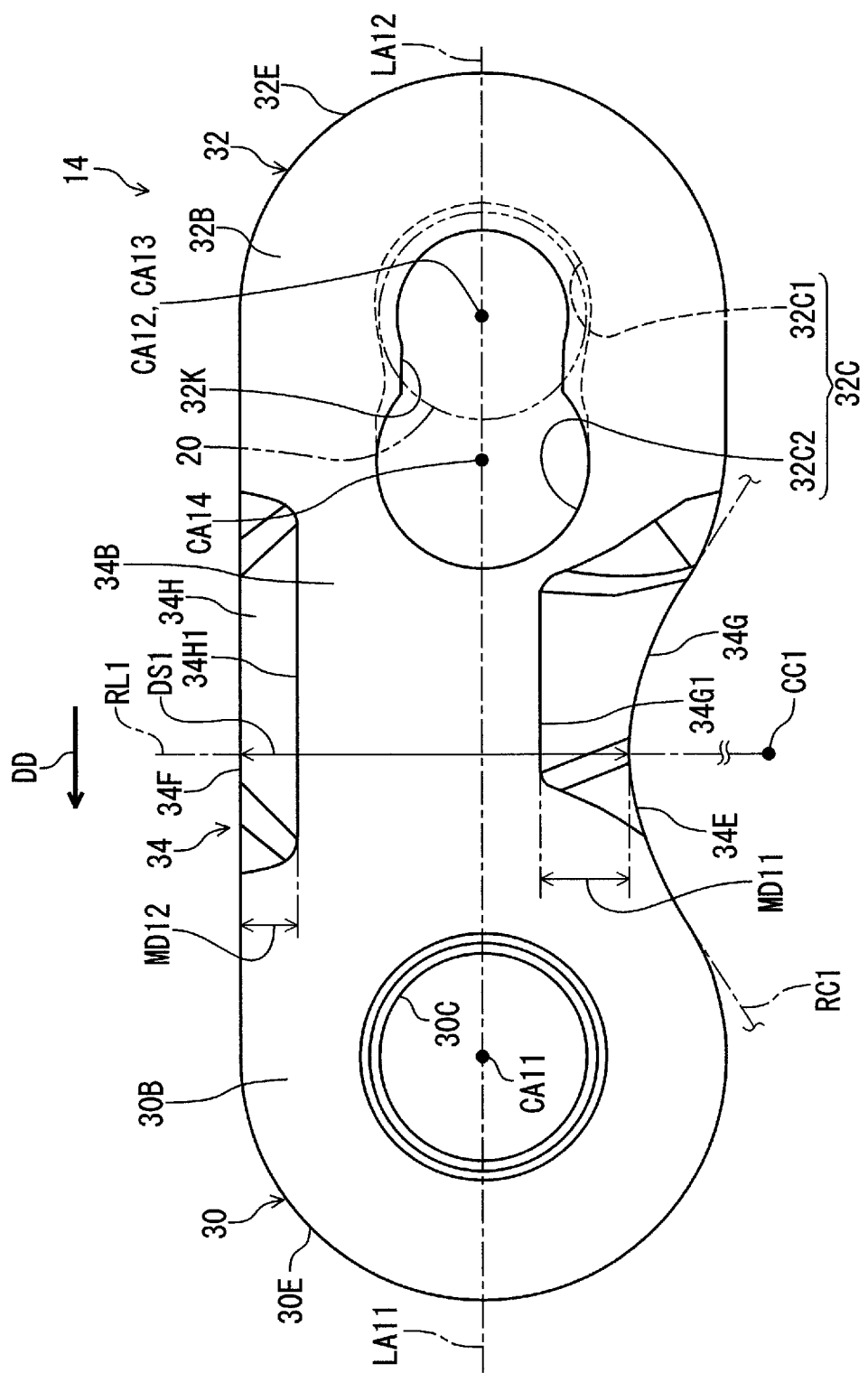
FIG. 20 is another side elevational view of a bicycle-chain outer link plate in accordance with a modification of the embodiment.

The first additional intermediate chamfer 34H has a first additional minimum distance MD12 defined between the first additional outer-link intermediate outermost edge 34F and the first additional radially inner edge 30G2 along the reference line RL1. The first additional minimum distance MD12 is equal to or larger than 1 mm. The first additional minimum distance MD12 is equal to or smaller than 2 mm. In this embodiment, the first additional minimum distance MD12 is 1.5 mm. Namely, the first additional minimum distance MD12 is equal to the first minimum distance MD11. As seen in FIG. 20, however, the first additional minimum distance MD12 can be different from the first minimum distance MD11. As seen in FIG. 17, however, the first additional minimum distance MD12 can be different from the first minimum distance MD11.

Figure 21:
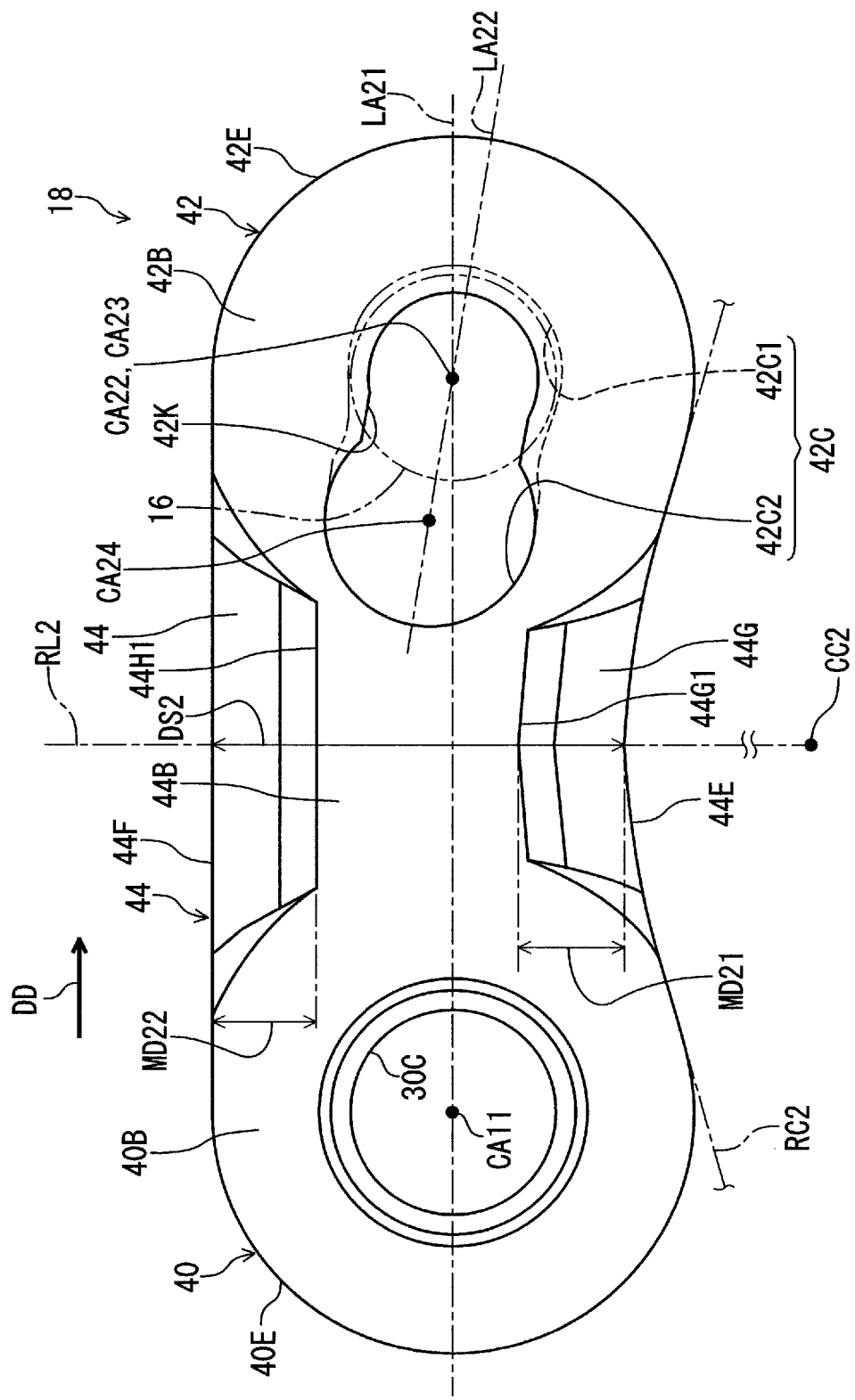
FIG. 21 is another side elevational view of the additional outer link plate illustrated in FIG. 8.

As seen in FIG. 21, the second outer-link intermediate portion 44 comprises a second intermediate chamfer 44G extending along the second outer-link intermediate outermost edge 44E. The second intermediate chamfer 44G has a second inner edge 44G1. The second intermediate chamfer 44G is provided between the second outer-link intermediate outermost edge 44E and the second inner edge 44G1. The second intermediate chamfer 44G extends from the second outer-link intermediate outermost edge 44E toward the second additional outer-link intermediate outermost edge 44F. The second intermediate chamfer 44G is provided on the second intermediate inner surface 44B and is disposed between the third outer-link end portion 40 and the fourth outer-link end portion 42.

The second intermediate chamfer 44G has a second minimum distance MD21 defined between the second outer-link intermediate outermost edge 44E and the second inner edge 44G1 along a reference line RL2. The reference line RL2 is perpendicular to a first outer-link longitudinal axis LA11. The first outer-link longitudinal axis LA11 extends from the third outer-link center axis CA21 to the fourth outer-link center axis CA22 when viewed in the axial direction D1 parallel to the third outer-link center axis CA21. A distance DS1 defined between the second outer-link intermediate outermost edge 44E and the second additional outer-link intermediate outermost edge 44F on the reference line RL2 is minimum in the second outer-link intermediate portion 44. The reference line RL2 extends from a center of curvature CC2 of a reference circular arc RC2 corresponding to the second outer-link intermediate outermost edge 44E when viewed in the axial direction D1. The second minimum distance MD21 is equal to or larger than 1 mm. The second minimum distance MD21 is equal to or smaller than 2 mm. In this embodiment, the second minimum distance MD21 is 1.5 mm. However, the second minimum distance MD21 is not limited to this embodiment and the above ranges.

The second outer-link intermediate portion 44 includes a second additional intermediate chamfer 44H extending along the second additional outer-link intermediate outermost edge 44F. The second additional intermediate chamfer 44H has a second additional inner edge 44H1. The second additional intermediate chamfer 44H is provided between the second additional outer-link intermediate outermost edge 44F and the second additional inner edge 44H1. The second additional intermediate chamfer 44H extends from the second additional outer-link intermediate outermost edge 44F toward the second outer-link intermediate outermost edge 44E. The second additional intermediate chamfer 44H is provided on the second intermediate inner surface 44B and is disposed between the third outer-link end portion 40 and the fourth outer-link end portion 42.

The second additional intermediate chamfer 44H has a second additional minimum distance MD22 defined between the second additional outer-link intermediate outermost edge 44F and the third additional radially inner edge 40G2 along the reference line RL2. The second additional minimum distance MD22 is equal to or larger than 1 mm. The second additional minimum distance MD22 is equal to or smaller than 2 mm. In this embodiment, the second additional minimum distance MD22 is 1.5 mm. Namely, the second additional minimum distance MD22 is equal to the second minimum distance MD21. Similarly to the bicycle-chain outer link plate 14 illustrated in FIG. 20, however, the second additional minimum distance MD22 can be different from the second minimum distance MD21.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle-chain outer link plate comprising:
a first outer-link end portion comprising:
   a first outer surface;
   a first inner surface provided on a reverse side of the first outer surface to face toward an additional outer link plate in an assembled state where the outer link plate and the additional outer link plate are assembled;
   a first outer-link opening having a first outer-link center axis and extending from the first outer surface to the first inner surface along the first outer-link center axis; and
   a first outer-link end outermost edge provided radially outwardly of the first outer-link opening;
a second outer-link end portion comprising:
   a second outer surface;
   a second inner surface provided on a reverse side of the second outer surface to face toward the additional outer link plate in the assembled state;
   a second outer-link opening having a second outer-link center axis and extending from the second outer surface to the second inner surface, the second outer-link opening including an attachment opening having an attachment center axis and an insertion opening having an insertion center axis; and
   a second outer-link end outermost edge provided radially outwardly of the second outer-link opening; and
a first outer-link intermediate portion interconnecting the first outer-link end portion and the second outer-link end portion, the first outer-link intermediate portion comprising:
   a first intermediate outer surface;
   a first intermediate inner surface provided on a reverse side of the first intermediate outer surface to face toward the additional outer link plate in the assembled state;
   a first outer-link intermediate outermost edge provided between the first outer-link end outermost edge and the second outer-link end outermost edge, at least a portion of the first outer-link intermediate outermost edge extending parallel to a first outer-link longitudinal axis extending from the first outer-link center axis to the second outer-link center axis and being tangential to at least one of the first outer-link end outermost edge and the second outer-link end outermost edge;
   a first additional outer-link intermediate outermost edge provided between the first outer-link end outermost edge and the second outer-link end outermost edge; and
   a first intermediate chamfer extending along the first outer-link intermediate outermost edge and having a first inner edge,
the first intermediate chamfer having a first minimum distance defined between the first outer-link intermediate outermost edge and the first inner edge along a reference line that is perpendicular to the first outer-link longitudinal axis when viewed in an axial direction parallel to the first outer-link center axis,
a distance defined between the first outer-link intermediate outermost edge and the first additional outer-link intermediate outermost edge on the reference line being minimum in the first outer-link intermediate portion,
the first minimum distance being equal to or larger than 1 mm, the second outer-link opening having a longitudinal axis that extends from the attachment center axis to the insertion center axis when viewed in the axial direction, and the longitudinal axis being inclined relative to the first outer link longitudinal axis when viewed in the axial direction.

2. The bicycle-chain outer link plate according to claim 1, wherein
the first minimum distance is equal to or smaller than 2 mm.

3. The bicycle-chain outer link plate according to claim 1, wherein
the first outer-link intermediate portion includes a first additional intermediate chamfer extending along the first additional outer-link intermediate outermost edge and having a first additional inner edge,
the first additional intermediate chamfer has a first additional minimum distance defined between the first additional outer-link intermediate outermost edge and the first additional inner edge along the reference line,
a distance defined between the first outer-link intermediate outermost edge and the first additional outer-link intermediate outermost edge on the reference line being minimum in the first outer-link intermediate portion, and
the first additional minimum distance is equal to or larger than 1 mm.

4. The bicycle-chain outer link plate according to claim 3, wherein
the first additional minimum distance is equal to or smaller than 2 mm.

5. The bicycle-chain outer link plate according to claim 3, wherein
the first additional minimum distance is different from the first minimum distance.

6. The bicycle-chain outer link plate according to claim 3, wherein
the first minimum additional distance is equal to the first minimum distance.

7. The bicycle-chain outer link plate according to claim 1, wherein
the first outer-link intermediate portion has a first distance defined in the axial direction on the first outer-link longitudinal axis,
the first outer-link intermediate outermost edge has a second distance defined in the axial direction,
the first outer-link end outermost edge has a third distance defined in the axial direction,
the first distance is larger than the second distance and the third distance, and
the second distance is larger than the third distance.

8. The bicycle-chain outer link plate according to claim 7, wherein
the first distance ranges from 0.87 mm to 0.91 mm.

9. The bicycle-chain outer link plate according to claim 7, wherein
the second distance ranges from 0.79 mm to 0.83 mm.

10. The bicycle-chain outer link plate according to claim 7, wherein
the third distance ranges from 0.44 mm to 0.48 mm.

11. The bicycle-chain outer link plate according to claim 1, wherein
the first outer-link intermediate portion has a first distance defined in the axial direction on the first outer-link longitudinal axis,
the first outer-link intermediate outermost edge has a second distance defined in the axial direction, and
the second distance ranges from 89% to 93% of the first distance.

12. The bicycle-chain outer link plate according to claim 11, wherein
the first distance ranges from 0.87 mm to 0.91 mm, and
the second distance ranges from 0.79 mm to 0.83 mm.

13. The bicycle-chain outer link plate according to claim 1, further comprising
an outline having an asymmetric shape relative to the first outer-link longitudinal axis when viewed in the axial direction.

14. A bicycle chain comprising:
the bicycle-chain outer link plate according to claim 1; and
a first link pin provided in the first outer-link opening, the first link pin being engaged with the additional outer link plate.

15. The bicycle-chain outer link plate according to claim 1, wherein
the first additional outer-link intermediate outermost edge entirely linearly extends in a direction parallel to the first outer-link longitudinal axis from the first outer-link end outermost edge to the second outer-link end outermost edge.

16. A bicycle-chain outer link plate comprising:
a first outer-link end portion comprising:
a first outer surface;
a first inner surface provided on a reverse side of the first outer surface to face toward an additional outer link plate in an assembled state where the outer link plate and the additional outer link plate are assembled;
a first outer-link opening having a first outer-link center axis and extending from the first outer surface to the first inner surface along the first outer-link center axis; and
a first outer-link end outermost edge provided radially outwardly of the first outer-link opening;
a second outer-link end portion comprising:
a second outer surface;
a second inner surface provided on a reverse side of the second outer surface to face toward the additional outer link plate in the assembled state;
a second outer-link opening having a second outer-link center axis extending from the second outer surface to the second inner surface, the second outer-link opening including an attachment opening having an attachment center axis and an insertion opening having an insertion center axis; and
a second outer-link end outermost edge provided radially outwardly of the second outer-link opening; and
a first outer-link intermediate portion interconnecting the first outer-link end portion and the second outer-link end portion, the first outer-link intermediate portion comprising:
a first intermediate outer surface;
a first intermediate inner surface provided on a reverse side of the first intermediate outer surface to face toward the additional outer link plate in the assembled state;
a first outer-link intermediate outermost edge provided between the first outer-link end outermost edge and the second outer-link end outermost edge, at least a portion of the first outer-link intermediate outermost edge extending parallel to a first outer-link longitudinal axis extending from the first outer-link center axis to the second outer-link center axis and being tangential to at least one of the first outer-link end outermost edge and the second outer-link end outermost edge;

a first additional outer-link intermediate outermost edge provided between the first outer-link end outermost edge and the second outer-link end outermost edge; and a first intermediate chamfer extending along the first outer-link intermediate outermost edge and having a first inner edge, the first intermediate chamfer having a first minimum distance defined between the first outer-link intermediate outermost edge and the first inner edge along a reference line that is perpendicular to the first outer-link longitudinal axis when viewed in an axial direction parallel to the first outer-link center axis, the reference line extending from a center of curvature of a reference circular arc corresponding to the first outer-link intermediate outermost edge when viewed in the axial direction, the first minimum distance being equal to or larger than 1 mm, the second outer-link opening having a longitudinal axis that extends from the attachment center axis to the insertion center axis when viewed in the axial direction, and the longitudinal axis being inclined relative to the first outer link longitudinal axis when viewed in the axial direction.

17. The bicycle-chain outer link plate according to claim 16, wherein the first additional outer-link intermediate outermost edge entirely linearly extends in a direction parallel to the first outer-link longitudinal axis from the first outer-link end outermost edge to the second outer-link end outermost edge.

18. The bicycle-chain outer link plate according to claim 16, wherein the reference line is disposed closer to a first outermost end of the first outer-link end portion in a direction coaxial with the first outer-link longitudinal axis than to a second outermost end of the second outer-link end portion in the direction coaxial with the first outer-link longitudinal axis.

19. A bicycle-chain outer link plate comprising:

a first outer-link end portion comprising:
  a first outer surface;
  a first inner surface provided on a reverse side of the first outer surface to face toward an additional outer link plate in an assembled state where the outer link plate and the additional outer link plate are assembled;
  a first outer-link opening having a first outer-link center axis and extending from the first outer surface to the first inner surface along the first outer-link center axis; and
  a first outer-link end outermost edge provided radially outwardly of the first outer-link opening;

a second outer-link end portion comprising:
  a second outer surface;
  a second inner surface provided on a reverse side of the second outer surface to face toward the additional outer link plate in the assembled state;
  a second outer-link opening having a second outer-link center axis and extending from the second outer surface to the second inner surface; and
  a second outer-link end outermost edge provided radially outwardly of the second outer-link opening; and a first outer-link intermediate portion interconnecting the first outer-link end portion and the second outer-link end portion, the first outer-link intermediate portion comprising:
  a first intermediate outer surface;
  a first intermediate inner surface provided on a reverse side of the first intermediate outer surface to face toward the additional outer link plate in the assembled state;
  a first outer-link intermediate outermost edge provided between the first outer-link end outermost edge and the second outer-link end outermost edge, at least a portion of the first outer-link intermediate outermost edge extending parallel to a first outer-link longitudinal axis extending from the first outer-link center axis to the second outer-link center axis and being tangential to at least one of the first outer-link end outermost edge and the second outer-link end outermost edge;
  a first additional outer-link intermediate outermost edge provided between the first outer-link end outermost edge and the second outer-link end outermost edge;
  a first intermediate chamfer extending along the first outer-link intermediate outermost edge and having a first inner edge; and
  a first additional intermediate chamfer extending along the first additional outer link intermediate outermost edge, the first intermediate chamfer having a first minimum distance defined between the first outer-link intermediate outermost edge and the first inner edge along a reference line that is perpendicular to the first outer-link longitudinal axis when viewed in an axial direction parallel to the first outer-link center axis, a distance defined between the first outer-link intermediate outermost edge and the first additional outer-link intermediate outermost edge on the reference line being minimum in the first outer-link intermediate portion, the first minimum distance being equal to or larger than 1 mm, and a shape of the first intermediate chamfer being different from a shape of the first additional intermediate chamfer.

20. A bicycle-chain outer link plate comprising:

a first outer-link end portion comprising:
  a first outer surface;
  a first inner surface provided on a reverse side of the first outer surface to face toward an additional outer link plate in an assembled state where the outer link plate and the additional outer link plate are assembled;
  a first outer-link opening having a first outer-link center axis and extending from the first outer surface to the first inner surface along the first outer-link center axis; and
  a first outer-link end outermost edge provided radially outwardly of the first outer-link opening;

a second outer-link end portion comprising:
  a second outer surface;
  a second inner surface provided on a reverse side of the second outer surface to face toward the additional outer link plate in the assembled state;
  a second outer-link opening having a second outer-link center axis extending from the second outer surface to the second inner surface; and
  a second outer-link end outermost edge provided radially outwardly of the second outer-link opening; and
a first outer-link intermediate portion interconnecting the first outer-link end portion and the second outer-link end portion, the first outer-link intermediate portion comprising:
  a first intermediate outer surface;
  a first intermediate inner surface provided on a reverse side of the first intermediate outer surface to face toward the additional outer link plate in the assembled state;
  a first outer-link intermediate outermost edge provided between the first outer-link end outermost edge and the second outer-link end outermost edge, at least a portion of the first outer-link intermediate outermost edge extending parallel to a first outer-link longitudinal axis extending from the first outer-link center axis to the second outer-link center axis and being tangential to at least one of the first outer-link end outermost edge and the second outer-link end outermost edge;
  a first additional outer-link intermediate outermost edge provided between the first outer-link end outermost edge and the second outer-link end outermost edge;
  a first intermediate chamfer extending along the first outer-link intermediate outermost edge and having a first inner edge; and
  a first additional intermediate chamfer extending along the first additional outer link intermediate outermost edge,
the first intermediate chamfer having a first minimum distance defined between the first outer-link intermediate outermost edge and the first inner edge along a reference line that is perpendicular to the first outer-link longitudinal axis when viewed in an axial direction parallel to the first outer-link center axis,
the reference line extending from a center of curvature of a reference circular arc corresponding to the first outer-link intermediate outermost edge when viewed in the axial direction, and
the first minimum distance being equal to or larger than 1 mm, and
a shape of the first intermediate chamfer being different from a shape of the first additional intermediate chamfer.

* * * * *